United States Patent [19]
Takatori

[11] Patent Number: 5,844,652
[45] Date of Patent: Dec. 1, 1998

[54] LIQUID CRYSTAL DISPLAY USING A LIQUID CRYSTAL SHOWING A FERROELECTRIC PROPERTY OR AN ANTI-FERROELECTRIC PROPERTY

[75] Inventor: Ken-ichi Takatori, Tokyo, Japan

[73] Assignee: NEC Corporation, Tokyo, Japan

[21] Appl. No.: 672,980

[22] Filed: Jul. 1, 1996

[30] Foreign Application Priority Data

Jun. 29, 1995 [JP] Japan ................................. 7-184963

[51] Int. Cl.⁶ .................................................. G02F 1/1343
[52] U.S. Cl. .......................................... 349/139; 349/141
[58] Field of Search ................................... 349/141, 139

[56] References Cited

U.S. PATENT DOCUMENTS 5,013,141  5/1991  Sakata ....................................... 349/139
5,493,426  2/1996  Johnson et al. ........................... 349/139

FOREIGN PATENT DOCUMENTS 62-159126  7/1987  Japan .

*Primary Examiner*—William L. Sikes
*Assistant Examiner*—James A. Dudek
*Attorney, Agent, or Firm*—Young & Thompson

[57] ABSTRACT

In a liquid crystal display, a liquid crystal is in the form of a layered structure between first and second substrates which are spaced apart from and parallel to each other. An intrinsic electric field is applied between the first and second substrates for controlling orientation of liquid crystal molecules, and that at least two electrodes are formed on any of the first and second substrates spaced apart from each other and applied with different voltages so that at least a lateral electric field is generated in parallel to surfaces of the first and second substrates. Planes of the layered structure of the liquid crystal are just or almost vertical to a direction of the lateral electric field.

52 Claims, 11 Drawing Sheets

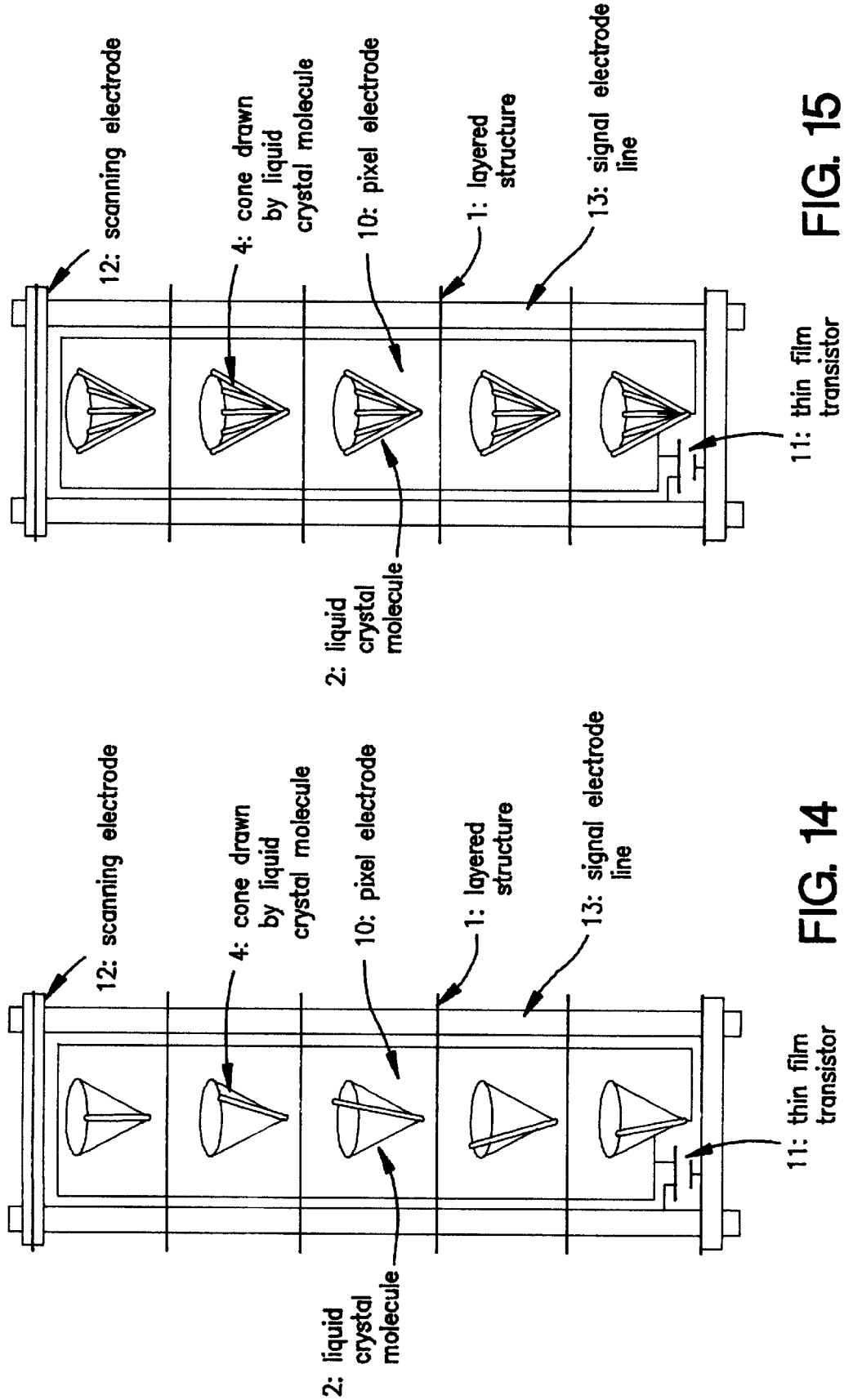

LIQUID CRYSTAL DISPLAY USING A LIQUID CRYSTAL SHOWING A FERROELECTRIC PROPERTY OR AN ANTI-FERROELECTRIC PROPERTY

BACKGROUND OF THE INVENTION

1. Fields of the Invention

The present invention relates to a liquid crystal display, and more particularly to a liquid crystal display using a liquid crystal having a layered structure and showing a ferroelectric property or an anti-ferroelectric property.

2. Description of the Related Art

The recent main stream of the liquid crystal displays commercially available has been to utilize either a multiplex driving in an STN-mode or an active matrix driving in TN-mode using thin film transistors, wherein the liquid crystal is classified into the nematic liquid crystal. It is, however, the fact that as long as the nematic liquid crystal is used, it is difficult to provide an enlargement of the screen size and improve definition of the image displayed on the screen. In order to satisfy the above requirements, it is necessary to have the liquid crystal possess a high speed performance and a wide viewing angle property, in light of which ferroelectric liquid crystals having a chiral smectic C phase and antiferroelectric liquid crystals having a chiral smectic Ca phase have recently received a great deal of attention.

A typical liquid crystal display using the ferroelectric liquid crystals having the chiral smectic C phase acting as an optical switching under the control of electric field was proposed by Lagerwall and Clark et al. and has been referred to as a surface stabilized ferroelectric liquid crystal, or SSFLC. This device is disclosed in the U.S. Pat. Nos. 4,367,924 and 4,563,059. The orientation of the surface stabilized ferroelectric liquid crystal molecule used in the above liquid crystal display is illustrated in FIG. 1. The surface stabilized ferroelectric liquid crystal is sandwiched between a pair of substrates 7. The surface stabilized ferroelectric liquid crystal molecules are oriented to form plural layered structures, wherein surfaces of the layers comprising the surface stabilized ferroelectric liquid crystal molecules are vertical to surfaces of the paired substrates 7 to form a bookshelf structure. The ferroelectric liquid crystal having the chiral smectic C phase is introduced and sealed within cell gaps of about 2 micrometers whereby the chiral smectic C phase is changed to dissolve the helical structure of the liquid crystal and as a result the chiral smectic C phase liquid crystal is made into the surface stabilized ferroelectric liquid crystal free of helical structure. If a negative or positive voltage is applied to the surface stabilized ferroelectric liquid crystal, then a spontaneous polarization 5 is directed in parallel to the electric field applied whereby surface stabilized ferroelectric liquid crystal molecules 2 are oriented to draw cones having a center axis vertical to both the surfaces of the substrates 7 and the surfaces of the layered structures 1 comprising the surface stabilized ferroelectric liquid crystal molecules 2. Namely, the top of the cones 4 are directed vertical to both the surfaces of the substrates 7 and the surfaces of the layered structures 1. The surface stabilized ferroelectric liquid crystal molecules 2 are allowed to be oriented in one of the bistable states in accordance with the polarization of the voltage applied to the surface stabilized ferroelectric liquid crystal. In the bistable states, the surface stabilized ferroelectric liquid crystal molecules 2 are oriented along a side face of the cone 4 where the surface stabilized ferroelectric liquid crystal molecules 2 in the opposite stable states are diametrically opposite sides on the side face of the cone 4. When the surface stabilized ferroelectric liquid crystal molecule 2 is placed in one of the bistable states, the surface stabilized ferroelectric liquid crystal is transparent in the bright state. If the surface stabilized ferroelectric liquid crystal molecule 2 is placed in the opposite state, the surface stabilized ferroelectric liquid crystal is not transparent in the dark state. This surface stabilized ferroelectric liquid crystal display is unable to do a gray scale display as utilizing the bistable states, for example, transparent and bright state and opaque and dark state for the surface stabilized ferroelectric liquid crystal molecule 2.

To overcome this problem and to obtain the gray scale display, there were proposed some driving modes in which the ferroelectric liquid crystal display is driven for performing the required gray scale display, one of which is the electric field treatment method proposed by Hartmann and disclosed in 1991 Ferroelectrics, Vol. 122, pp. 1–26. This describes that under application of no electric field, a polymer-aligned surface stabilized ferroelectric liquid crystal usually exhibits optical switching angle between both stable memory states of nearly equal to 15 degrees instead of the preferred angle of 45 degrees due to a tile of the smectic layers toward the glass plates. This structure is referred to as chevron structure. This results in an additional reduction in brightness of nearly equal to 75%. This reduction in brightness can be avoided by applying a low frequency electric field to the liquid crystal to make the chevron structure into a pseudo-bookshelf structure whereby various fine multi-domains are generated in accordance with the intensity of the applied voltage. Such various fine multi-domains in one pixel can realize area gray scale. This means that the gray scale display is obtainable.

Another ferroelectric liquid crystal display performing the gray scale display by utilizing the single stable state and uniform orientation of the liquid crystal was proposed and disclosed in the Japanese laid-open patent application No. 4-212126. The structure of this ferroelectric liquid crystal display is illustrated in FIG. 3. A pair of substrates are treated by rubbing the same in the same direction and set in parallel to each other to sandwich the ferroelectric liquid crystals having the chiral smectic C phase. If no voltage is applied to the ferroelectric liquid crystals having the chiral smectic C phase, then component, projected on the substrate, of the center axis of the cones 4 drawn by the ferroelectric liquid crystal molecules 2 is parallel to the direction of the rubbing treatment as well as component, projected on the substrate, of the major axis of the ferroelectric liquid crystal molecules 2 is also parallel to the direction of the rubbing treatment. Namely, the direction of the spontaneous polarization of the ferroelectric liquid crystal molecules 2 is parallel to the surfaces of the substrates but in vertical to the direction of the rubbing treatment. At this time, the ferroelectric liquid crystals having the chiral smectic C phase takes a single stable state and a mono-domain of the ferroelectric liquid crystals is formed over entire regions. If negative voltage is applied to the ferroelectric liquid crystal molecules 2, then the ferroelectric liquid crystal molecules 2 tilt so that the arrow mark representing the direction of the spontaneous polarization of the ferroelectric liquid crystal molecules 2 rotates in the anticlockwise direction along the circular of the bottom of the cone 4 drawn by the liquid crystal molecules 2 in the bottom view of the cone 4. The degree of the rotation of the ferroelectric liquid crystal molecules 2 depends upon the intensity of the applied negative voltage and a distance from the rubbing-treated surface of the substrates. In the vicinity of the rubbing-treated surface of the substrates, almost no or small tilt of the ferroelectric liquid crystal molecules 2 is observed whilst at positions distanced from the rubbing-treated surface of the substrates, relatively large titles of the ferroelectric liquid crystal molecules 2 are observed. The tilt angles of the ferroelectric liquid crystal molecules 2 continuously vary. This means it is possible to obtain continuously variable gray scale display as illustrated in FIGS. 3 and 4. If, however, the positive voltage is applied the ferroelectric liquid crystal molecules 2, then the ferroelectric liquid crystal molecules 2 also tilt so that the arrow mark representing the direction of the spontaneous polarization of the ferroelectric liquid crystal molecules 2 rotates but in the clockwise direction along the circular of the bottom of the cone 4 drawn by the liquid crystal molecules 2 in the bottom view of the cone 4. The degree of the rotation of the ferroelectric liquid crystal molecules 2 also depends upon the intensity of the applied negative voltage and the distance from the rubbing-treated surface of the substrates. In the vicinity of the rubbing-treated surface of the substrates, almost no or small tilt of the ferroelectric liquid crystal molecules 2 is observed whilst at positions distanced from the rubbing-treated surface of the substrates, relatively large tilting of the ferroelectric liquid crystal molecules 2 in observed. The tilt angles of the ferroelectric liquid crystal molecules 2 continuously vary. This means it is possible to obtain continuously variable gray scale display as illustrated in FIGS. 3 and 4.

Still another ferroelectric liquid crystal display performing the gray scale display is one which utilizes deformed helix Ferroelectrics of the liquid crystal. This liquid crystal was proposed by Ostovski et al. and is disclosed in Advanced in Liquid Crystal Research and Applications, Oxford/Budapest, 1980, p. 469 and also disclosed in the Japanese laid-open Patent Application No. 1-152430. Such display is illustrated in FIG. 5. The ferroelectric liquid crystals having the chiral smectic C phase has a spontaneous helical structure which helix pitch is sufficiently smaller than the cell gap whereby the surface stabilization can never prevent forming the helical structure. The liquid crystal is most typically oriented to form layered structures 1 constituting the bookshelf structure and further to cause the helical structure of the liquid crystal molecules 2. If a certain voltage is applied to the liquid crystal molecules 2, then the helical structure of the liquid crystal molecules 2 is made into a deformed helical structure. As illustrated in FIG. 6, double refraction is changed to vary the transmissivity whereby the continuous gray scale display can be obtained. The driving method for such display is described in the Japanese Laid-open Patent Application No. 6-194625.

Yet another ferroelectric liquid crystal display performing the gray scale display is one which utilizing the ferroelectric twisted smectic structure, which is disclosed in the U.S. Pat. No. 5,172,257 issued to Patel. The structure of this liquid crystal display utilizing the ferroelectric twisted smectic structure is illustrated in FIG. 7. The direction of the rubbing treatment is twisted by 90 degrees between the top and bottom substrates. The cell gap is thick so as to allow the orientation of the liquid crystal molecules 2 to be twisted by 90 degrees between the top and bottom substrates. The liquid crystal molecules 2 tilt on the cone 4 drawn by themselves whilst the layered structure 1 is vertical to the surfaces of the substrates to thereby form the bookshelf structure.

If no voltage is applied to the liquid crystal molecules 2, then the liquid crystal molecules 2 shows a twist of plane of polarization of light by 90 degrees. If further a polarization plate is so set that a transparent axis is vertical, the darkness is obtained. If a certain voltage is applied to the liquid crystal molecules 2, then the twisted structure of the liquid crystal molecules 2 is deformed and the liquid crystal is continuously made transparent whereby a continuous gray scale can be obtained.

An anti-ferroelectric liquid crystal display performing the gray scale display was reported by Yamamoto et al. and is disclosed in Ferroelectrics 1993, Vol. 149, pp. 295–304. The application of the anti-ferroelectric liquid crystal display performing the gray scale display was reported by Chandani et al. and is disclosed in the Japanese Journal of Applied Physics, 1988, Vol. 27, pp. L276-L729. The anti-ferroelectric liquid crystal molecules take tristable states as illustrated in FIG. 8. If no voltage is applied to the anti-ferroelectric liquid crystal molecules, then the anti-ferroelectric liquid crystal molecules perform the anti-ferroelectric property. If a positive or negative voltage is applied to the anti-ferroelectric liquid crystal molecules, then the anti-ferroelectric liquid crystal molecules is changed to show the ferroelectric property. In order to obtain the gray scale display, it is required to divide the anti-ferroelectric liquid crystal into a plurality of fine domains within each pixel whereby an area gray scale is realized.

Relationships between the electrodes and the applied electric field for the foregoing liquid crystal displays will be described with reference to FIG. 9 provided TFT panel is adopted. On a bottom substrate, a pixel electrode 10 and a scanning electrode 12 are formed whilst on a top substrate, an opposite electrode 9 is formed. Such display utilizes a spontaneous polarization 5 possessed by the ferroelectric or anti-ferroelectric liquid crystal and applies an electric field 3 between the top and bottom substrates to cause switch of the orientation of the liquid crystal molecules 2. In compliance with the structure of the substrate, it is, however, possible that there is formed a position at which a lateral electric field 6 in parallel to the surface of the substrate but vertical to the electric field 3 applied between the top and bottom substrates is generated, and an intensity of the lateral electric field 6 is larger than the electric field 3. The liquid crystal molecules 2 forcibly responsive to the lateral electric field 6 and tilt from the desired orientation along the cone 4 drawn by themselves. The direction of the spontaneous polarization 5 of the liquid crystal molecules 2 as well as the orientation thereof are different from those in the normal state where no lateral electric field is generated. This results in a reduction in contrast of the brightness and makes it difficult to obtain a desired quality of the display. If the lateral electric field remains for a certain time period, then a surface orientation of the liquid crystal positioned in the vicinity of any of the surfaces of the substrates is changed to thereby form undesirable domain of the liquid crystal molecules 2 having different orientations from the desired orientations thereof. Such undesirable domain remains unless this undesirable structure is deformed intentionally.

The above undesirable lateral electric field is likely to be generated particularly when the substrates using the thin film transistors is combined with those liquid crystal display mode. This results the fact the pixel electrode as well as the scanning electrode and the signal electrodes for driving the thin film transistor connected to the pixel electrode are formed on the same substrate or laterally provided and thus the potential differences between these electrodes can generate the undesirable lateral electric field. The lateral electric field may cause a certain defect on the display.

SUMMARY OF THE INVENTION

Accordingly, it is an object of the present invention is to provide a novel liquid crystal display using a ferroelectric or anti-ferroelectric liquid crystal having a smectic phase, which is free from the problem as described above.

It is a further object of the present invention is to provide a novel liquid crystal display using a ferroelectric or anti-ferroelectric liquid crystal having a smectic phase, which has an improved electrode arrangement being capable of suppressing a lateral electric field in parallel to surfaces of top and bottom substrates sandwiching the ferroelectric or anti-ferroelectric liquid crystal.

It is a further more object of the present invention is to provide a novel liquid crystal display using a ferroelectric or anti-ferroelectric liquid crystal having a smectic phase, which is capable of display at a high contrast without any defect thereon.

The above and other objects, features and advantages of the present invention will be apparent from the following descriptions.

The present invention provides a liquid crystal display, in which the liquid crystal is in the form of a layered structure between first and second substrates which are spaced apart from and parallel to each other. An intrinsic electric field is applied between the first and second substrates for controlling orientation of liquid crystal molecules, and that at least two electrodes are formed on any of the first and second substrates spaced apart from each other and applied with different voltages so that at least a lateral electric field is generated in parallel to surfaces of the first and second substrates. Planes of the layered structure of the liquid crystal are just or almost vertical to a direction of the lateral electric field.

The present invention also provides a liquid crystal in a liquid crystal display, in which the liquid crystal is in the form of a layered structure between first and second substrates which are spaced apart from and parallel to each other. An intrinsic electric field is applied between the first and second substrates for controlling orientation of liquid crystal molecules. At least two electrodes are formed on any of the first and second substrates spaced apart from each other and applied with different voltages so that at least a lateral electric field is generated in parallel to surfaces of the first and second substrates. Each of the liquid crystal molecules shows a tilting motion under control by application of the intrinsic electric field so as to have a major axis of the each liquid crystal molecule draw a cone. It is important that a center axis of the cone has a projected component on the first and second substrates and the projected component is just or almost parallel to a direction of the lateral electric field.

The present invention also provides a liquid crystal display comprising the following elements. First and second substrates are spaced apart from and parallel to each other. A liquid crystal is in the form of a layered structure between the first and second substrates. Orientation of the liquid crystal is controlled by an intrinsic electric field applied between the first and second substrates. At least two electrodes are formed on any of the first and second substrates spaced apart from each other and applied with different voltages so that at least a lateral electric field is generated in parallel to surfaces of the first and second substrates. Planes of the layered structure of the liquid crystal are just or almost vertical to a direction of the lateral electric field.

The present invention also provides a liquid crystal display comprising the following elements. First and second substrates are spaced apart from and parallel to each other. A liquid crystal is in the form of a layered structure between the first and second substrates. Orientation of the liquid crystal is controlled by an intrinsic electric field applied between the first and second substrates so that each of the liquid crystal molecules shows a tilting motion to have a major axis of the each liquid crystal molecule draw a cone. At least two electrodes are formed on any of the first and second substrates spaced apart from each other and applied with different voltages so that at least a lateral electric field is generated in parallel to surfaces of the first and second substrates. A center axis of the cone has a projected component on the first and second substrates and the projected component is just or almost parallel to a direction of the lateral electric field.

BRIEF DESCRIPTIONS OF THE DRAWINGS

Preferred embodiments according to the present invention will be described in detail with reference to the accompanying drawings.

Figure 1:
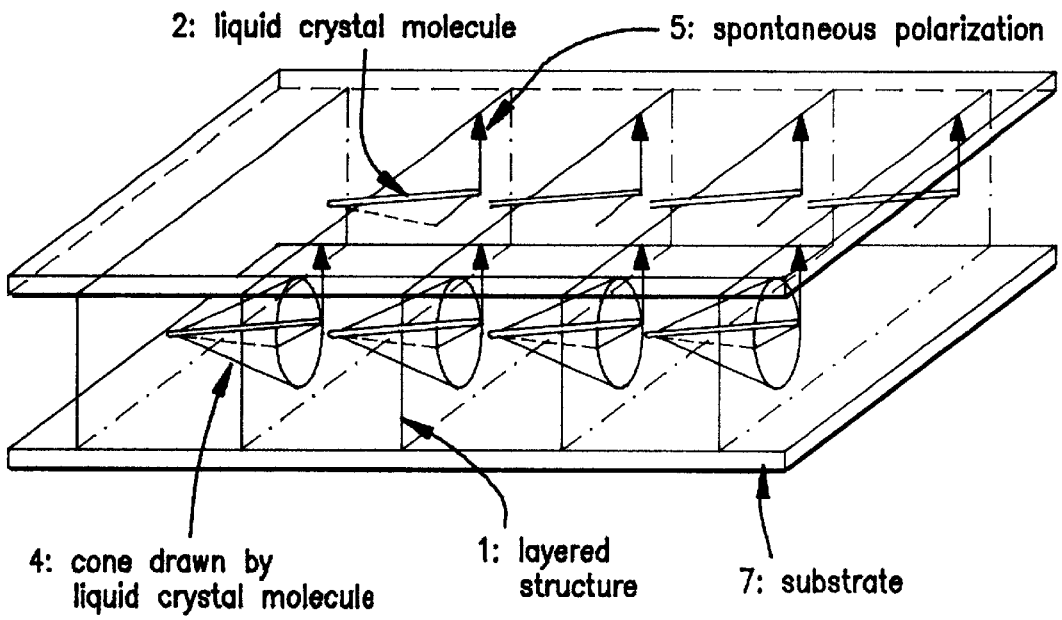
FIG. 1 is a view illustrative of the conventional liquid crystal display using ferroelectric liquid crystals having a chiral smectic C phase.
Figure 5:
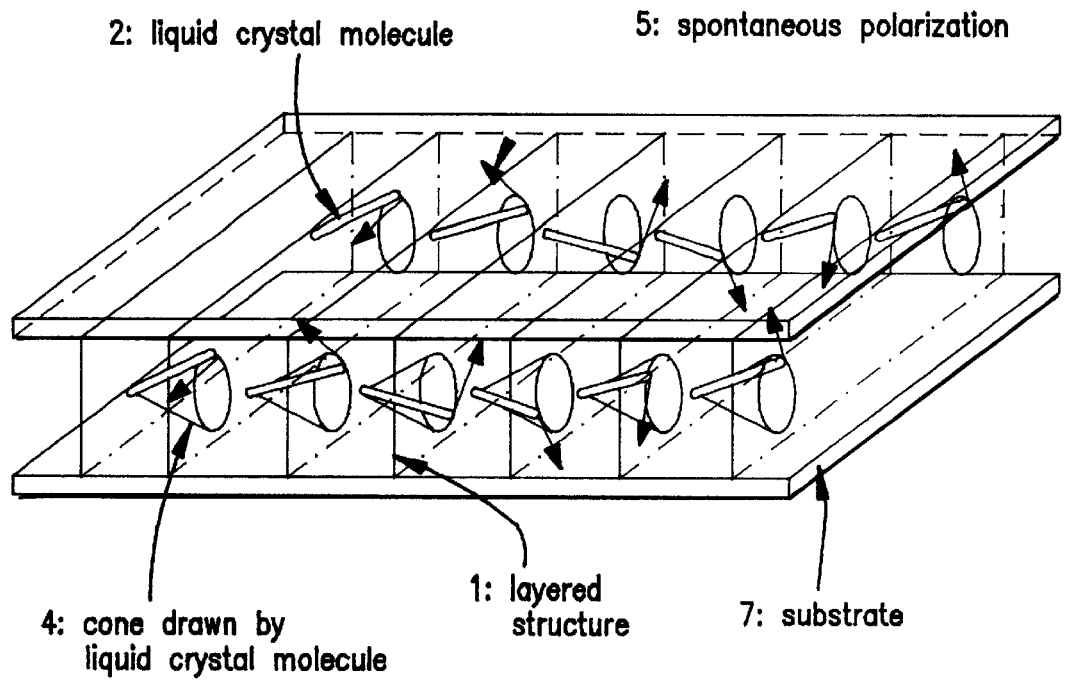
FIG. 5 is a view illustrative of the conventional ferroelectric liquid crystal display performing the gray scale display by utilizing deformed helix ferroelectrics of the liquid crystal.
Figure 2:
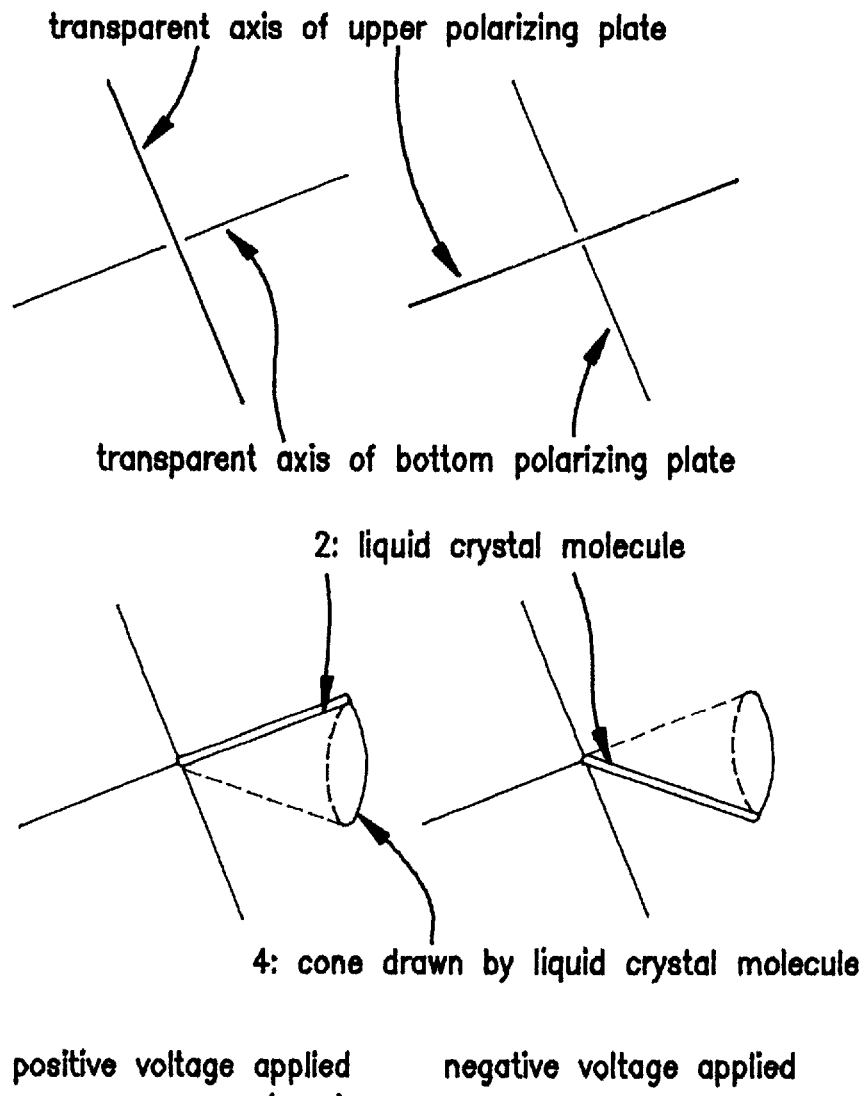
FIG. 2 is a view illustrative of orientation of a surface stabilized ferroelectric liquid crystal molecule used in the conventional liquid crystal display using ferroelectric liquid crystals having a chiral smectic C phase.
Figure 3:
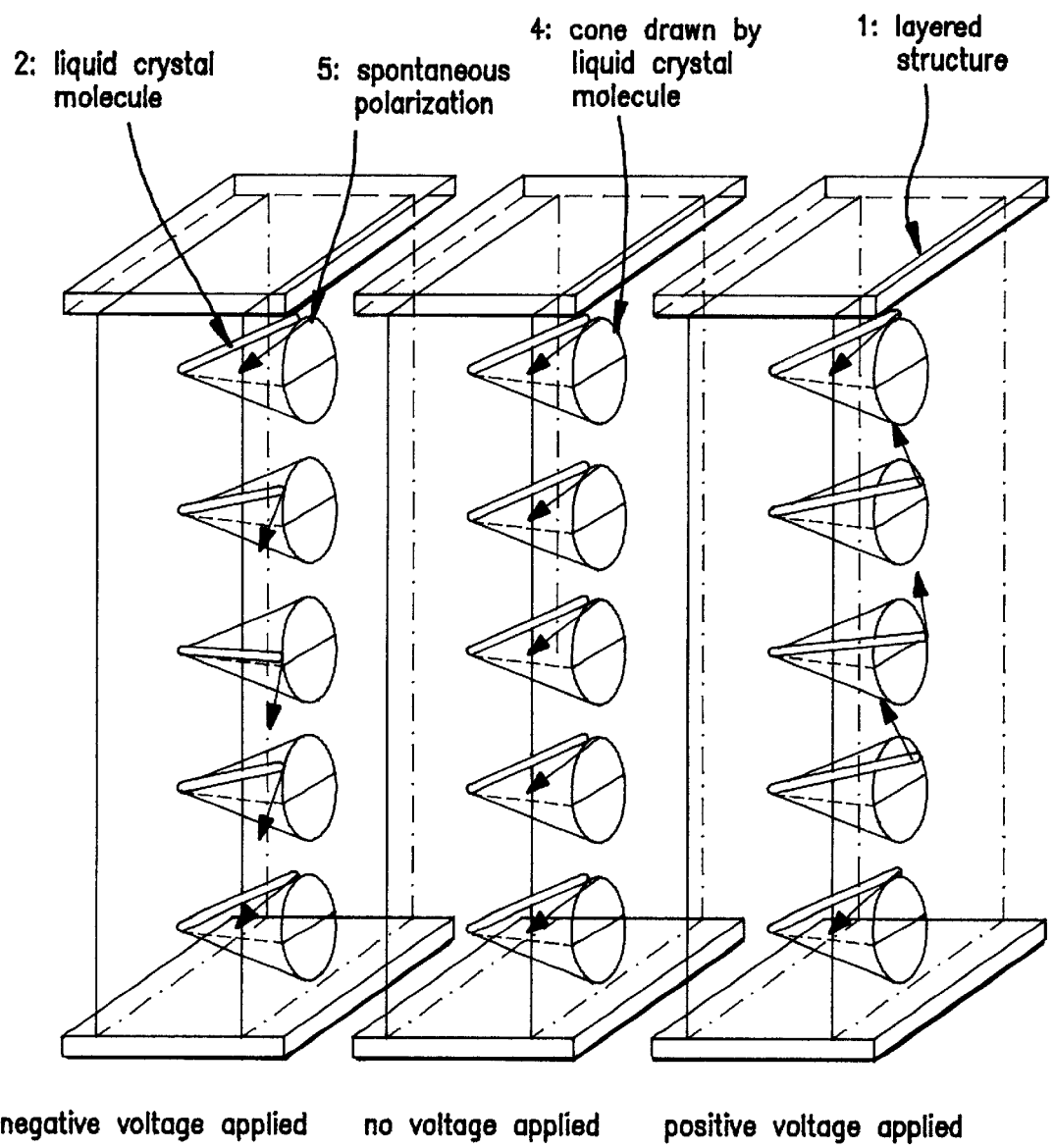
FIG. 3 is a view illustrative of the conventional ferroelectric liquid crystal display performing a gray scale display by utilizing a single stable state and uniform orientation of the liquid crystal.
Figure 4:
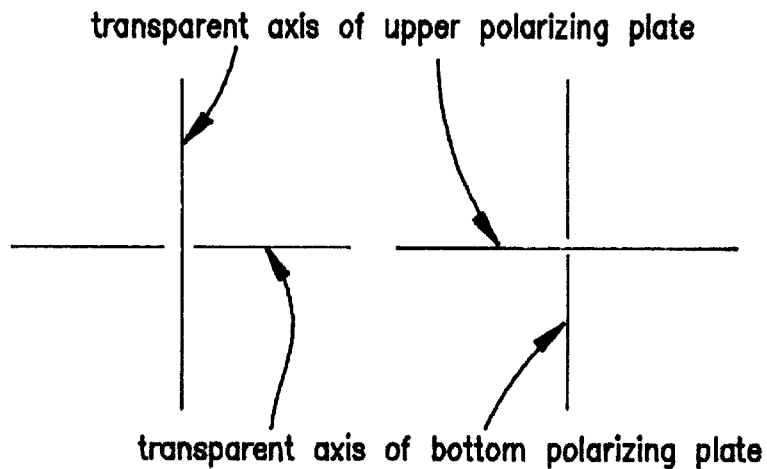
FIG. 4 is a view illustrative of orientation of liquid crystal molecules used in the conventional ferroelectric liquid crystal display performing a gray scale display by utilizing a single stable state and uniform orientation of the liquid crystal.
Figure 4:
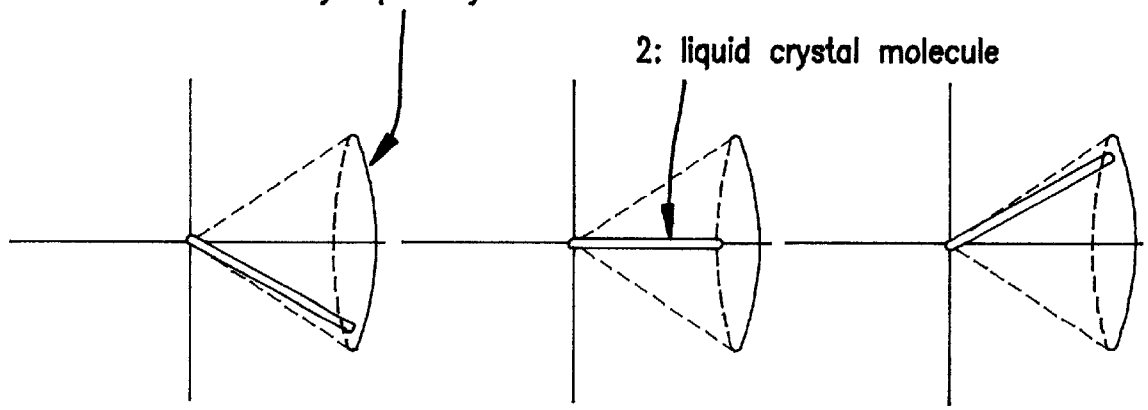
Figure 6:
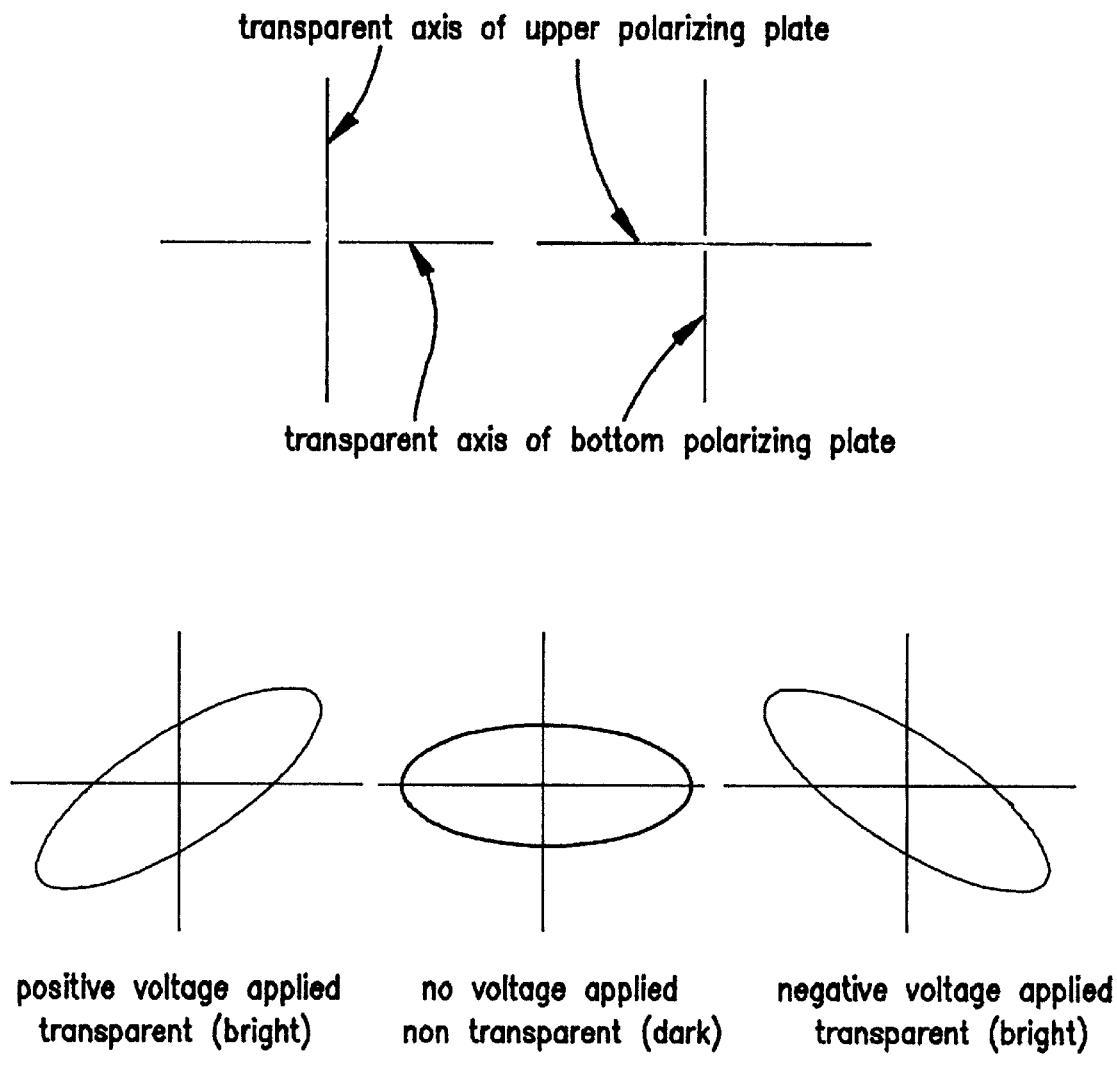
FIG. 6 is a view illustrative of orientation of liquid crystal molecules used in the conventional ferroelectric liquid crystal display performing the gray scale display by utilizing deformed helix ferroelectrics of the liquid crystal.
Figure 7:
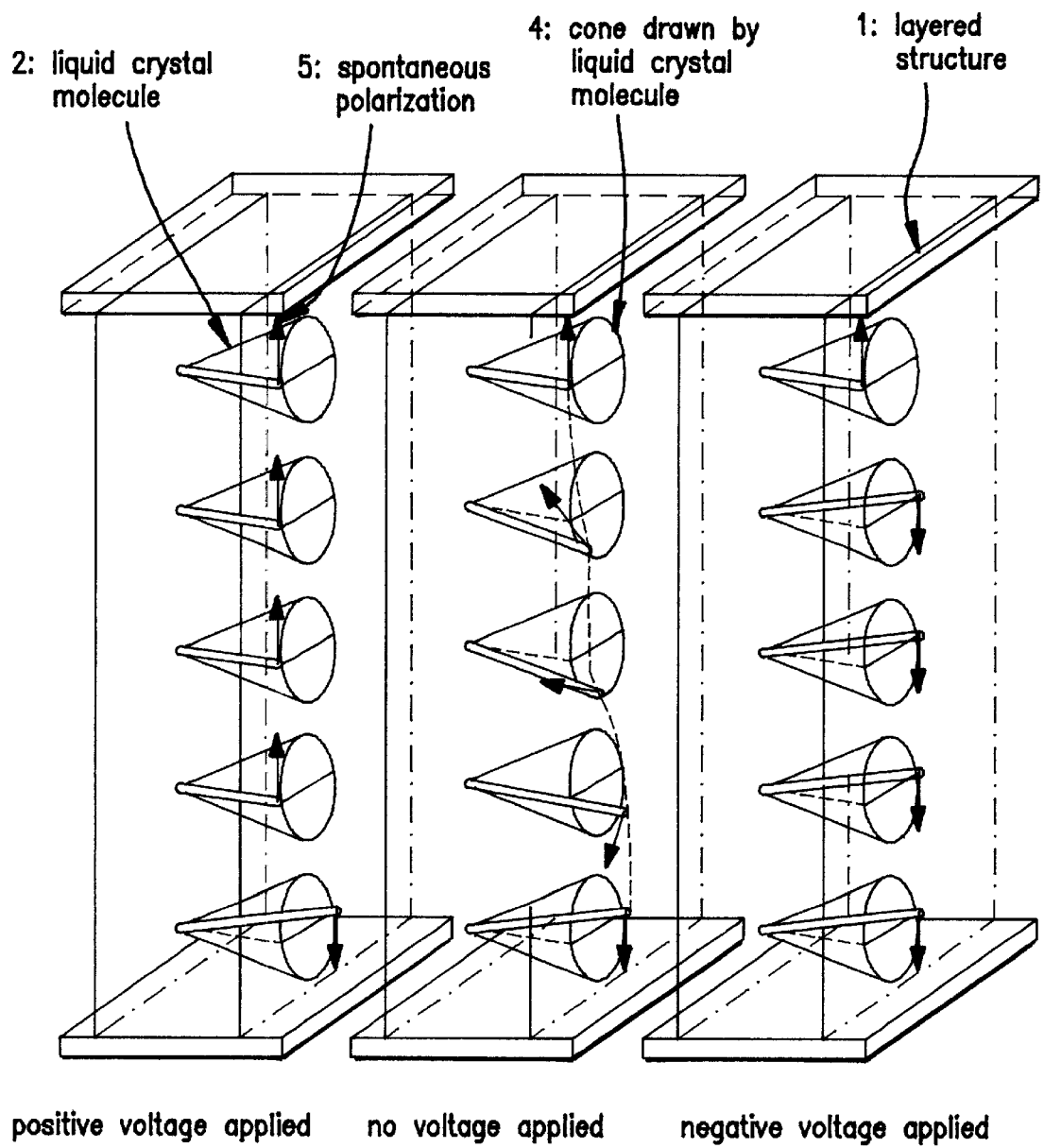
FIG. 7 is a view illustrative of the conventional ferroelectric liquid crystal display performing the gray scale display by utilizing the ferroelectric twisted smectic structure.
Figure 8:
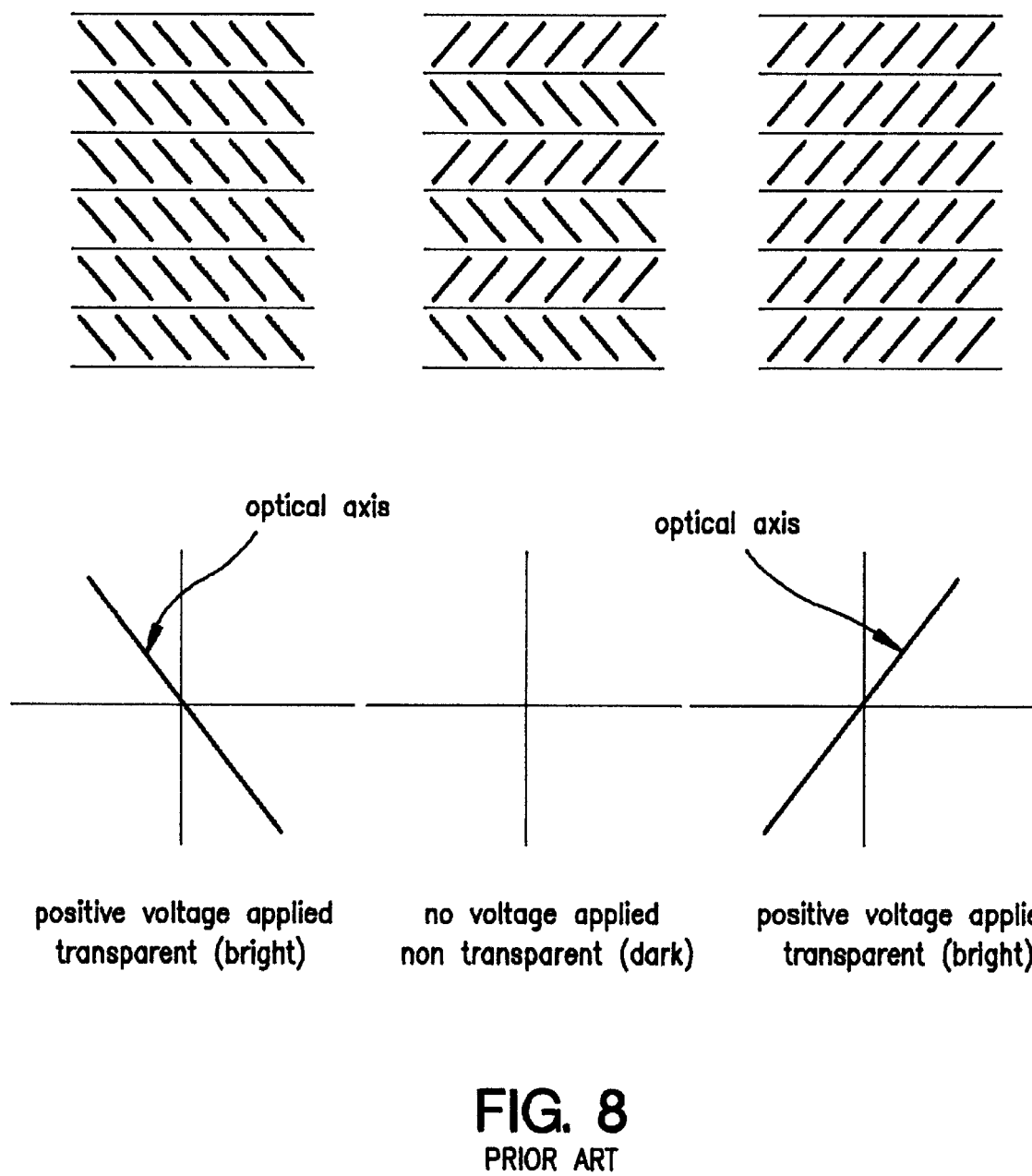
FIG. 8 is a view illustrative of the conventional anti-ferroelectric liquid crystal display performing the gray scale display which takes tristable states.
Figure 9:
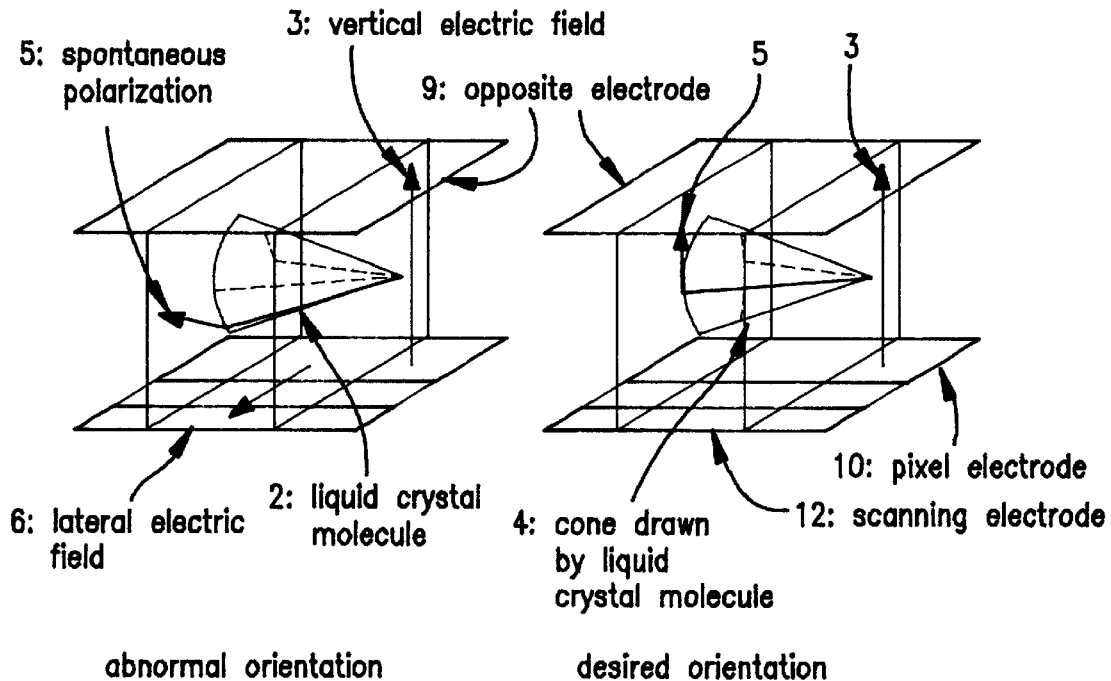
FIG. 9 is a view illustrative of the conventional liquid crystal display allowing an undesirable lateral electric field in parallel to surfaces of top and bottom substrates sandwiching the ferroelectric or anti-ferroelectric liquid crystal.

FIG. 14 is a view illustrative of a structure of a thin film transistor substrate used in a novel ferroelectric or anti-ferroelectric liquid crystal display in a third embodiment according to the present invention FIG. 15 is a view illustrative of a structure of a thin film transistor substrate used in a novel ferroelectric or anti-ferroelectric liquid crystal display in a fourth embodiment according to the present invention.

DETAILED DESCRIPTION OF THE PREFERRED EMBODIMENTS

The present invention provides a liquid crystal in a liquid crystal display, in which the liquid crystal is in the form of a layered structure between first and second substrates which are spaced apart from and parallel to each other. An intrinsic electric field is applied between the first and second substrates for controlling orientation of liquid crystal molecules, and that at least two electrodes are formed on any of the first and second substrates spaced apart from each other and applied with different voltages so that at least a lateral electric field is generated in parallel to surfaces of the first and second substrates. Planes of the layered structure of the liquid crystal are just or almost vertical to a direction of the lateral electric field.

It is possible that if plural lateral electric fields are generated which have different intensities, then the planes of the layered structure of the liquid crystal are just or almost vertical to a direction of a strongest lateral electric field among the plural lateral electric fields.

Additionally that the above at least two electrodes maybe are a scanning electrode and a pixel electrode.

Further the liquid crystal comprises a ferroelectric liquid crystal having a smectic phase. In this case, the smectic phase is a chiral smectic phase. It is preferable that the ferroelectric liquid crystal having the chiral smectic phase is a surface stabilized ferroelectric liquid crystal.

Alternatively, it is also preferable that the ferroelectric liquid crystal having the chiral smectic phase has a pseudo-bookshelf structure prepared by applying a low frequency electric field to the liquid crystal.

Further, alternatively, it is also preferable that the ferroelectric liquid crystal having the chiral smectic phase takes a single stable state in which a direction of spontaneous polarization of liquid crystal molecules is perpendicular parallel to the surfaces of the first and second substrates and perpendicular to a direction of rubbing treatment having been subjected to the first and second substrates and a mono-domain of the ferroelectric liquid crystal entirely extends.

Furthermore, alternatively, it is also preferable that the ferroelectric liquid crystal having the chiral smectic phase has a deformed helical structure.

Moreover, alternatively, it is also preferable that the ferroelectric liquid crystal having the chiral smectic phase has a twisted smectic structure.

In place of the foregoing ferroelectric liquid crystals, it is also preferable that the liquid crystal comprises an anti-ferroelectric liquid crystal having a smectic phase. In this case, the smectic phase is a chiral smectic phase.

As described above, in accordance with the present invention, among lateral electric fields in parallel to surfaces of the substrates, the direction of the most strong lateral electric field is just or almost parallel to a center axis of a cone drawn by a major axis of liquid crystal molecules. In the most cases, if the normal of a layer of the liquid crystal in the smectic phase is set to be just or almost parallel to the direction of the most strong lateral electric field, then the direction of the most strong lateral electric field is just or almost parallel to the center axis of the cone drawn by the major axis of liquid crystal molecules. In case of TFT substrate, the electric field between a scanning electrode line and a pixel electrode is the strongest lateral electric field and the scanning electrode line is so provided as to have the strongest electric field parallel to the normal of the layer of the liquid crystal in the smectic phase by providing the scanning electrode line in parallel to the layers of the liquid crystal in the smectic phase.

Figure 11:
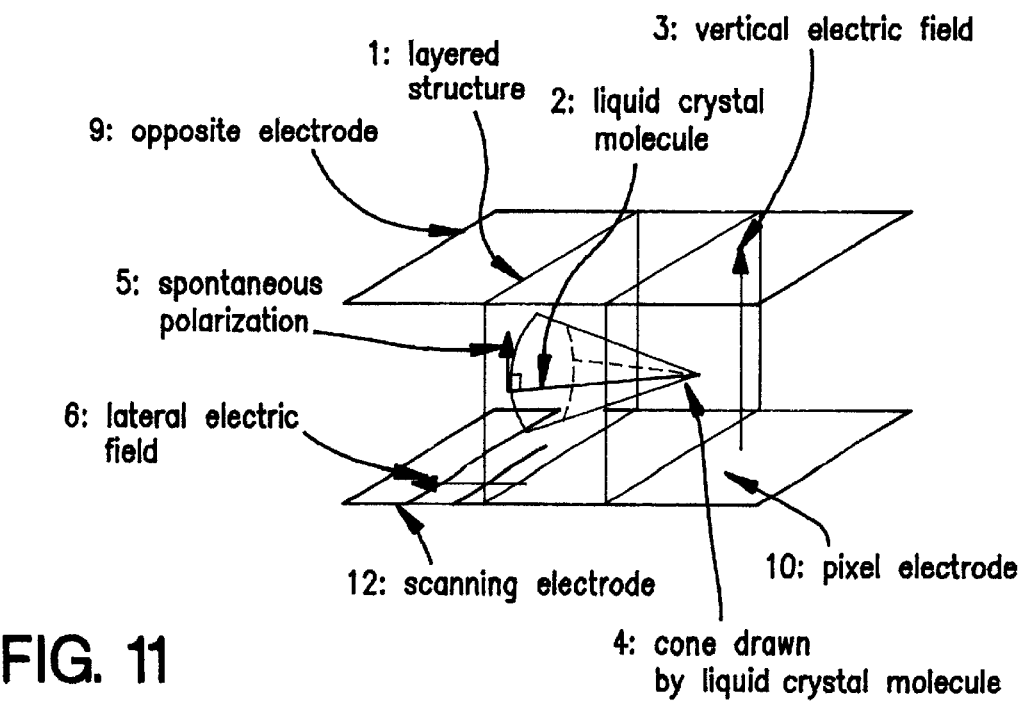
FIG. 11 is a view illustrative of a novel ferroelectric or anti-ferroelectric liquid crystal display according to the present invention.
Figure 10:
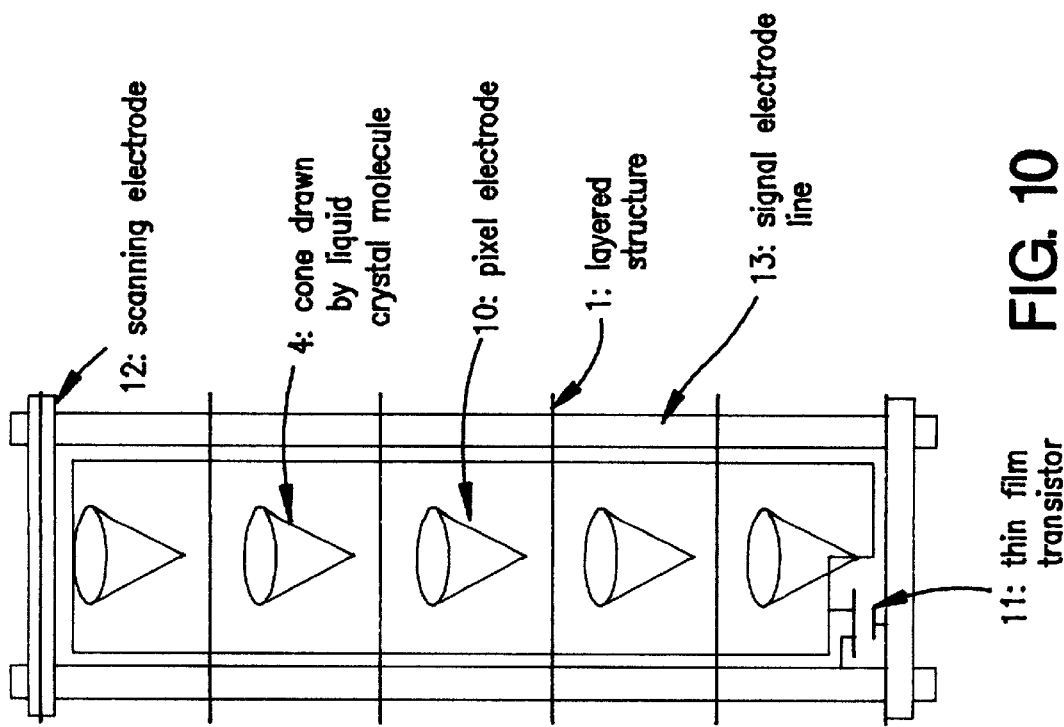
FIG. 10 is a view illustrative of a structure of a thin film transistor substrate used in a novel ferroelectric or anti-ferroelectric liquid crystal display according to the present invention.
Figure 13:
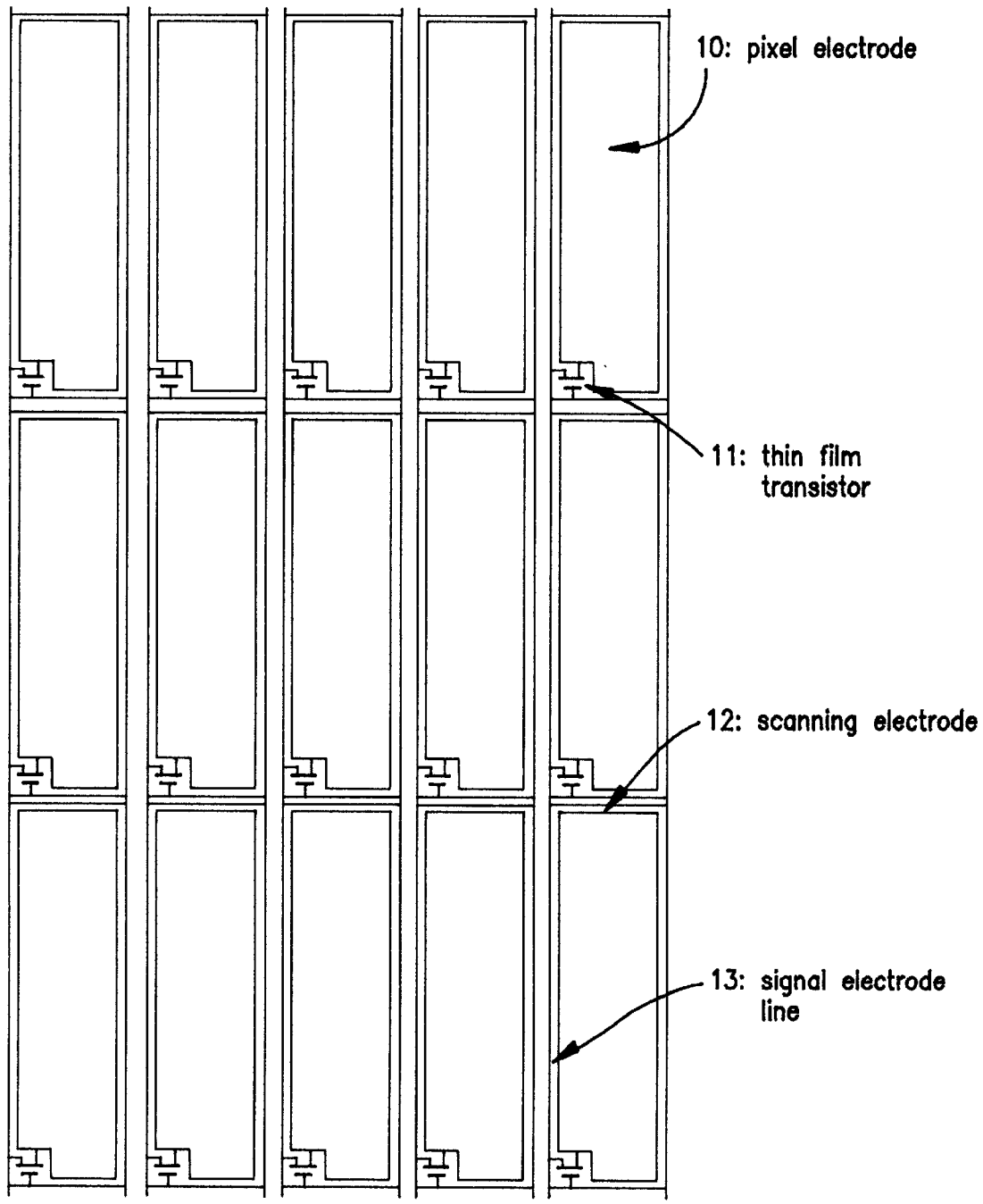
FIG. 13 is a view illustrative of a structure of a thin film transistor array in a novel ferroelectric or anti- ferroelectric liquid crystal display in a first embodiment according to the present invention.

FIG. 10 is a view illustrative of a structure of a thin film transistor substrate used in a novel ferroelectric or anti-ferroelectric liquid crystal display according to the present invention, and FIG. 11 is a view illustrative of a novel ferroelectric or anti- ferroelectric liquid crystal display according to the present invention.

In the liquid crystal display using the thin film transistors, the electric field between a scanning electrode line 12 and a pixel electrode 10 is the strongest lateral electric field 6, and thus the scanning electrode line 12 is so provided as to have the strongest electric field 6 parallel to the normal of layer 1 of a liquid crystal 2 in the smectic phase by providing the scanning electrode line 12 in parallel to the layer 1 of the liquid crystal 2 in the smectic phase. Particularly when the ferroelectric or anti-ferroelectric liquid crystal having the chiral smectic C phase is used, it is likely that the layer 1 of the liquid crystal 2 is just or almost parallel to bottoms of cones 4 drawn by the major axis of liquid crystal molecules 2 and the center axis of the cone 4 is vertical to the layer 1 of the liquid crystal 2. As long as a large lateral electric field 6 parallel to the center axis of the cone 4 drawn by the major axis of the ferroelectric or anti-ferroelectric liquid crystal 2 having the chiral smectic C phase is superimposed over an intrinsic electric field 3 applied between a pixel electrode 10 and am opposite electrode 9, it is unlikely that the orientation of the ferroelectric or anti-ferroelectric liquid crystal molecules 2 having the chiral smectic C phase is changed by the large lateral electric field 6 due to the fact that the large lateral electric field 6 always remains vertical to various directions of spontaneous polarization of the ferroelectric or anti-ferroelectric liquid crystal molecules 2 having the chiral smectic C phase. This means that the ferroelectric or anti-ferroelectric liquid crystal molecules 2 having the chiral smectic C phase can be free of any disorder of the orientation due to the large lateral electric field 6.

When the scanning electrode line 12, the signal electrode line 13 and the pixel electrode 10 are formed on the same substrate, the electric field between the scanning electrode line 12 and the pixel electrode 10 is the strongest lateral electric field and the scanning electrode line 12 is provided in parallel to the layered structure 1 of the liquid crystal so as to have the strongest lateral electric field 6 parallel to the normal of the layered structure 1 of the liquid crystal 2.

The above present invention is applicable to any liquid crystal display as long as a crystal liquid has a layered structure and is either ferroelectric or anti-ferroelectric liquid crystal having a smectic phase and electrodes are provided to generate a lateral electric field in parallel to surfaces of the substrates.

The present invention also provides a liquid crystal in a liquid crystal display, in which the liquid crystal is in the form of a layered structure between first and second substrates which are spaced apart from and parallel to each other. An intrinsic electric field is applied between the first and second substrates for controlling orientation of liquid crystal molecules. At least two electrodes are formed on any of the first and second substrates spaced apart from each other and applied with different voltages so that at least a lateral electric field is generated in parallel to surfaces of the first and second substrates. Each of the liquid crystal molecules shows a tilting motion under control by application of the intrinsic electric field so as to have a major axis of the each liquid crystal molecule draw a cone. It is important that a center axis of the cone has a projected component on the first and second substrates and the projected component is just or almost parallel to a direction of the lateral electric field.

If plural lateral electric fields are generated which have different intensities, then the projected component maybe just or almost parallel to a direction of a strongest lateral electric field among the plural lateral electric fields.

Also available that the above at least two electrodes maybe a scanning electrode and a pixel electrode.

Further the liquid crystal may comprise a ferroelectric liquid crystal having a smectic phase. In this case, it is preferable that the smectic phase is a chiral smectic phase.

It is further preferable that the ferroelectric liquid crystal having the chiral smectic phase is a surface stabilized ferroelectric liquid crystal.

Alternatively, it is also preferable that the ferroclectric liquid crystal having the chiral smectic phase has a pseudo-bookshelf structure prepared by applying a low frequency electric field to the liquid crystal.

Further, alternatively, it is also preferable that the ferroelectric liquid crystal having the chiral smectic phase takes a single stable state in which a direction of spontaneous polarization of liquid crystal molecule is perpendicular to the surfaces of the first and second substrates and perpendicular to a direction of rubbing treatment having been subjected to the first and second substrates and a monodomain of the ferroelectric liquid crystal entirely extends.

Furthermore, alternatively, it is also preferable that the ferroelectric liquid crystal having the chiral smectic phase has a deformed helical structure.

Moreover, alternatively, it is also preferable that the ferroelectric liquid crystal having the chiral smectic phase has a twisted smectic structure.

In place of the foregoing ferroelectric liquid crystals, it is also available that the liquid crystal comprises an anti-ferroelectric liquid crystal having a smectic phase. In this case, it is also preferable that the smectic phase is a chiral smectic phase.

As described above, in accordance with the present invention, among lateral electric fields in parallel to surfaces of the substrates, the direction of the most strong lateral electric field is just or almost parallel to a center axis of a cone drawn by a major axis of liquid crystal molecules. In the most cases, if the normal of a layer of the liquid crystal in the smectic phase is set to be just or almost parallel to the direction of the most strong lateral electric field, then the direction of the most strong lateral electric field is just or almost parallel to the center axis of the cone drawn by the major axis of liquid crystal molecules. In case of TFT substrate, the electric field between a scanning electrode line and a pixel electrode is the strongest lateral electric field and the scanning electrode line is so provided as to have the strongest electric field parallel to the normal of the layer of the liquid crystal in the smectic phase by providing the scanning electrode line in parallel to the layers of the liquid crystal in the smectic phase.

FIG. 10 is a view illustrative of a structure of a thin film transistor substrate used in a novel ferroelectric or anti-ferroelectric liquid crystal display according to the present invention, and FIG. 11 is a view illustrative of a novel ferroelectric or anti- ferroelectric liquid crystal display according to the present invention.

In the liquid crystal display using the thin film transistors, the electric field between a scanning electrode line 12 and a pixel electrode 10 is the strongest lateral electric field 6, and thus the scanning electrode line 12 is so provided as to have the strongest electric field 6 parallel to the normal of layer 1 of a liquid crystal 2 in the smectic phase by providing the scanning electrode line 12 in parallel to the layer 1 of the liquid crystal 2 in the smectic phase. Particularly when the ferroelectric or anti-ferroelectric liquid crystal having the chiral smectic C phase is used, it is likely that the layer 1 of the liquid crystal 2 is just or almost parallel to bottoms of cones 4 drawn by the major axis of liquid crystal molecules 2 and the center axis of the cone 4 is vertical to the layer 1 of the liquid crystal 2. As along as a large lateral electric field 6 parallel to the center axis of the cone 4 drawn by the major axis of the ferroelectric or anti-ferroelectric liquid crystal 2 having the chiral smectic C phase is superimposed over an intrinsic electric field 3 applied between a pixel electrode 10 and am opposite electrode 9, it is unlikely that the orientation of the ferroelectric or anti-ferroelectric liquid crystal molecules 2 having the chiral smectic C phase is changed by the large lateral electric field 6 due to the large lateral electric field 6 always remains vertical to various directions of spontaneous polarization of the ferroelectric or anti-ferroelectric liquid crystal molecules 2 having the chiral smectic C phase. This means that the ferroelectric or anti-ferroelectric liquid crystal molecules 2 having the chiral smectic C phase can be free of any disorder of the orientation due to the large lateral electric field 6.

When the scanning electrode line 12, the signal electrode line 13 and the pixel electrode 10 are formed on the same substrate, the electric field between the scanning electrode line 12 and the pixel electrode 10 is the strongest lateral electric field and the scanning electrode line 12 is provided in parallel to the layered structure 1 of the liquid crystal so as to have the strongest lateral electric field 6 parallel to the normal of the layered structure 1 of the liquid crystal 2.

The above present invention is applicable to any liquid crystal display as long as a crystal liquid has a layered structure and is either ferroelectric or anti-ferroelectric liquid crystal having a smectic phase and electrodes are provided to generate a lateral electric field in parallel to surfaces of the substrates.

The present invention also provides a liquid crystal display comprising the following elements. First and second substrates are spaced apart from and parallel to each other. A liquid crystal is in the form of a layered structure between the first and second substrates. Orientation of the liquid crystal is controlled by an intrinsic electric field applied between the first and second substrates. At least two electrodes are formed on any of the first and second substrates spaced apart from each other and applied with different voltages so that at least a lateral electric field is generated in parallel to surfaces of the first and second substrates. Planes of the layered structure of the liquid crystal are just or almost vertical to a direction of the lateral electric field.

It is available that if plural lateral electric fields are generated which have different intensities, then the planes of the layered structure of the liquid crystal are just or almost vertical to a direction of a strongest lateral electric field among the plural lateral electric fields.

It is available that the above at least two electrodes are a scanning electrode and a pixel electrode.

It is also available that the liquid crystal comprises a ferroelectric liquid crystal having a smectic phase. In this case, it is available that the smectic phase is a chiral smectic phase. In this case, it is preferable that the ferroelectric liquid crystal having the chiral smectic phase is a surface stabilized ferroelectric liquid crystal.

Alternatively, it is also preferable that the ferroelectric liquid crystal having the chiral smectic phase has a pseudo-bookshelf structure prepared by applying a low frequency electric field to the liquid crystal.

Further, alternatively, it is also preferable that the ferroelectric liquid crystal having the chiral smectic phase takes a single stable state in which a direction of spontaneous polarization of liquid crystal molecules is perpendicular to the surfaces of the first and second substrates and perpendicular to a direction of rubbing treatment having been subjected to the first and second substrates and a monodomain of the ferroelectric liquid crystal entirely extends.

Further more, alternatively, it is also preferable that the ferroelectric liquid crystal having the chiral smectic phase has a deformed helical structure.

Moreover, alternatively, it is also preferable that the ferroelectric liquid crystal having the chiral smectic phase has a twisted smectic structure.

In place of the foregoing ferroelectric liquid crystals, it is also preferable that the liquid crystal comprises an anti-ferroelectric liquid crystal having a smectic phase. In this case, it is preferable that the smectic phase is a chiral smectic phase.

As described above, in accordance with the present invention, among lateral electric fields in parallel to surfaces of the substrates, the direction of the most strong lateral electric field is just or almost parallel to a center axis of a cone drawn by a major axis of liquid crystal molecules. In the most cases, if the normal of a layer of the liquid crystal in the smectic phase is set to be just or almost parallel to the direction of the most strong lateral electric field, then the direction of the most strong lateral electric field is just or almost parallel to the center axis of the cone drawn by the major axis of liquid crystal molecules. In case of TFT substrate, the electric field between a scanning electrode line and a pixel electrode is the strongest lateral electric field and the scanning electrode line is so provided as to have the strongest electric field parallel to the normal of the layer of the liquid crystal in the smectic phase by providing the scanning electrode line in parallel to the layers of the liquid crystal in the smectic phase.

FIG. 10 is a view illustrative of a structure of a thin film transistor substrate used in a novel ferroelectric or anti-ferroelectric liquid crystal display according to the present invention, and FIG. 11 is a view illustrative of a novel ferroelectric or anti- ferroelectric liquid crystal display according to the present invention.

In the liquid crystal display using the thin film transistors, the electric field between a scanning electrode line 12 and a pixel electrode 10 is the strongest lateral electric field 6, and thus the scanning electrode line 12 is so provided as to have the strongest electric field 6 parallel to the normal of layer 1 of a liquid crystal 2 in the smectic phase by providing the scanning electrode line 12 in parallel to the layer 1 of the liquid crystal 2 in the smectic phase. Particularly when the ferroelectric or anti-ferroelectric liquid crystal having the chiral smectic C phase is used, it is likely that the layer 1 of the liquid crystal 2 is just or almost parallel to bottoms of cones 4 drawn by the major axis of liquid crystal molecules 2 and the center axis of the cone 4 is vertical to the layer 1 of the liquid crystal 2. As along as a large lateral electric field 6 parallel to the center axis of the cone 4 drawn by the major axis of the ferroelectric or anti-ferroelectric liquid crystal 2 having the chiral smectic C phase is superimposed over an intrinsic electric field 3 applied between a pixel electrode 10 and am opposite electrode 9, it is unlikely that the orientation of the ferroelectric or anti-ferroelectric liquid crystal molecules 2 having the chiral smectic C phase is changed by the large lateral electric field 6 due to the large lateral electric field 6 always remains vertical to various directions of spontaneous polarization of the ferroelectric or anti-ferroelectric liquid crystal molecules 2 having the chiral smectic C phase. This means that the ferroelectric or anti-ferroelectric liquid crystal molecules 2 having the chiral smectic C phase can be free of any disorder of the orientation due to the large lateral electric field 6.

When the scanning electrode line 12, the signal electrode line 13 and the pixel electrode 10 are formed on the same substrate, the electric field between the scanning electrode line 12 and the pixel electrode 10 is the strongest lateral electric field and the scanning electrode line 12 is provided in parallel to the layered structure 1 of the liquid crystal so as to have the strongest lateral electric field 6 parallel to the normal of the layered structure 1 of the liquid crystal 2.

The above present invention is applicable to any liquid crystal display as long as a crystal liquid has a layered structure and is either ferroelectric or anti-ferroelectric liquid crystal having a smectic phase and electrodes are provided to generate a lateral electric field in parallel to surfaces of the substrates.

The present invention also provides a liquid crystal display comprising the following elements. First and second substrates are spaced apart from and parallel to each other. A liquid crystal is in the form of a layered structure between the first and second substrates. Orientation of the liquid crystal is controlled by an intrinsic electric field applied between the first and second substrates so that each of the liquid crystal molecules shows a tilting motion to have a major axis of the each liquid crystal molecule draw a cone. At least two electrodes are formed on any of the first and second substrates spaced apart from each other and applied with different voltages so that at least a lateral electric field is generated in parallel to surfaces of the first and second substrates. A center axis of the cone has a projected component on the first and second substrates and the projected component is just or almost parallel to a direction of the lateral electric field.

It is preferable that if plural lateral electric fields are generated which have different intensities, then the projected component is just or almost parallel to a direction of a strongest lateral electric field among the plural lateral electric fields.

It is also preferable that the above at least two electrodes are a scanning electrode and a pixel electrode.

It is also preferable that the liquid crystal comprises a ferroelectric liquid crystal having a smectic phase. In this case, it is preferable that the smectic phase is a chiral smectic phase.

Alternatively, it is also preferable that the ferroelectric liquid crystal having the chiral smectic phase is a surface stabilized ferroelectric liquid crystal.

Further, alternatively, it is also preferable that the ferroelectric liquid crystal having the chiral smectic phase has a pseudo-bookshelf structure prepared by applying a low frequency electric field to the liquid crystal.

Furthermore, alternatively, it is also available that the ferroelectric liquid crystal having the chiral smectic phase takes a single stable state in which a direction of spontaneous polarization of liquid crystal molecules is perpidcular to the surfaces of the first and second substrates and perpidicular to a direction of rubbing treatment having been subjected to the first and second substrates and a mono-domain of the ferroelectric liquid crystal entirely extends.

Moreover, alternatively, it is also preferable that the ferroelectric liquid crystal having the chiral smectic phase has a deformed helical structure.

Still more, alternatively, it is also preferable that the ferroelectric liquid crystal having the chiral smectic phase has a twisted smectic structure.

In place of the foregoing ferroelectric liquid crystals, it is also available that the liquid crystal comprises an anti-ferroelectric liquid crystal having a smectic phase. In this case, it is preferable that the smectic phase is a chiral smectic phase.

As described above, in accordance with the present invention, among lateral electric fields in parallel to surfaces of the substrates, the direction of the most strong lateral electric field is just or almost parallel to a center axis of a cone drawn by a major axis of liquid crystal molecules. In the most cases, if the normal of a layer of the liquid crystal in the smectic phase is set to be just or almost parallel to the direction of the most strong lateral electric field, then the direction of the most strong lateral electric field is just or almost parallel to the center axis of the cone drawn by the major axis of liquid crystal molecules. In case of TFT substrate, the electric field between a scanning electrode line and a pixel electrode is the strongest lateral electric field and the scanning electrode line is so provided as to have the strongest electric field parallel to the normal of the layer of the liquid crystal in the smectic phase by providing the scanning electrode line in parallel to the layers of the liquid crystal in the smectic phase.

FIG. 10 is a view illustrative of a structure of a thin film transistor substrate used in a novel ferroelectric or anti-ferroelectric liquid crystal display according to the present invention, and FIG. 11 is a view illustrative of a novel ferroelectric or anlti- ferroelectric liquid crystal display according to the present invention.

In the liquid crystal display using the thin film transistors, the electric field between a scanning electrode line 12 and a pixel electrode 10 is the strongest lateral electric field 6, and thus the scanning electrode line 12 is so provided as to have the strongest electric field 6 parallel to the normal of layer 1 of a liquid crystal 2 in the smectic phase by providing the scanning electrode line 12 in parallel to the layer 1 of the liquid crystal 2 in the smectic phase. Particularly when the ferroelectric or anti-ferroelectric liquid crystal having the chiral smectic C phase is used, it is likely that the layer I of the liquid crystal 2 is just or almost parallel to bottoms of cones 4 drawn by the major axis of liquid crystal molecules 2 and the center axis of the cone 4 is vertical to the layer 1 of the liquid crystal 2. As along as a large lateral electric field 6 parallel to the center axis of the cone 4 drawn by the major axis of the ferroelectric or anti-ferroelectric liquid crystal 2 having the chiral smectic C phase is superimposed over an intrinsic electric field 3 applied between a pixel electrode 10 and am opposite electrode 9, it is unlikely that the orientation of the ferroelectric or anti-ferroelectric liquid crystal molecules 2 having the chiral smectic C phase is changed by the large lateral electric field 6 due to the large lateral electric field 6 always remains vertical to various directions of spontaneous polarization of the ferroelectric or anti-ferroelectric liquid crystal molecules 2 having the chiral smectic C phase. This means that the ferroelectric or anti-ferroelectric liquid crystal molecules 2 having the chiral smectic C phase can be free of any disorder of the orientation due to the large lateral electric field 6.

When the scanning electrode line 12, the signal electrode line 13 and the pixel electrode 10 are formed on the same substrate, the electric field between the scanning electrode line 12 and the pixel electrode 10 is the strongest lateral electric field and the scanning electrode line 12 is provided in parallel to the layered structure 1 of the liquid crystal so as to have the strongest lateral electric field 6 parallel to the normal of the layered structure 1 of the liquid crystal 2.

The above present invention is applicable to any liquid crystal display as long as a crystal liquid has a layered structure and is either ferroelectric or anti-ferroclectric liquid crystal having a smectic phase and electrodes are provided to generate a lateral electric field in parallel to surfaces of the substrates.

First Embodiment

Figure 12:
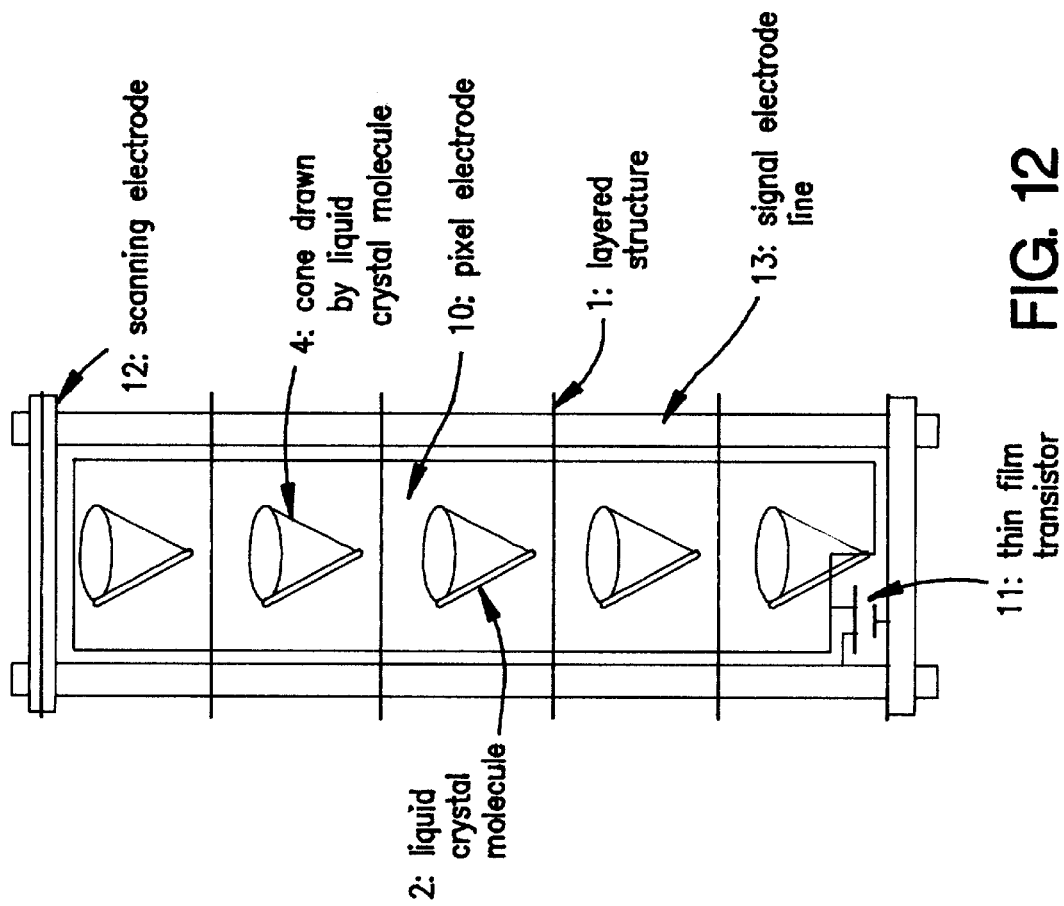
FIG. 12 is a view illustrative of a structure of a thin film transistor substrate used in a novel ferroelectric or anti-ferroelectric liquid crystal display in a first embodiment according to the present invention.

A first embodiment according to the present invention will be described hereafter. The present invention is applied to the thin film transistor liquid crystal display. FIG. 12 illustrates thin film transistor liquid crystal cell arrays used in this embodiment. As an active element, a thin film transistor 11 including an amorphous silicon layer is used. Each pixel has a size of 300×100 micrometers. A scanning electrode line 12 and a signal electrode line 13 comprise chromium lines having a width of 10 micrometers which has been prepared by a sputtering method. The thin film transistor 11 has a gate oxide film which is made of silicon nitride. Each pixel electrode 10 is transparent and made of indium tin oxide. Each pixel electrode 10 is formed by a sputtering method. The thin film transistors 11 are formed in array on a first substrate made of a glass material. An opposite substrate is provided in parallel to the first substrate and spaced apart from the first substrate. On the second substrate, an optical shielding film made of chromium is formed and subsequently a common electrode is formed thereon, which is transparent and is made of indium tin oxide. Further, a color filter is formed in matrix by a dyeing method on the common electrode. A protection layer made of silica is further formed on the color filter.

After cleaning the first and second substrates, polyamide films are applied on the first and second substrates before the first and second substrates are burned at a temperature of 200° C. to make the polyamide films into polyimide orientation films. The polyimide orientation films on the first and second substrates are subjected to a rubbing treatment by use of a buff cloth of rayon. The directions of the rubbing treatments to the first and second substrates are parallel to each other and are set so that a layered structure 1 of the liquid crystal of the smectic phase is parallel to the scanning electrode line 12. The first and second substrates are bonded to each other via spacers comprising spherical silica particles so as to form a gap of 1.5 micrometers between the first and second substrates whereby a display panel is formed.

A ferroelectric liquid crystal having a chiral smectic C phase is introduced into the gap between the first and second substrates. An apparent tilt angle of major axis of ferroelectric liquid crystal molecules in the ferroelectric liquid crystal is 22.0 degrees. An angle of the cone drawn by the major axis of ferroelectric liquid crystal molecules is approximately 22.0 degrees.

A test cell having the same structure as described above is prepared so that a nematic liquid crystal is introduced into the gap between the substrates of the test cell. A pre-tilt angle of nematic liquid crystal molecules in the nematic liquid crystal is 8 degrees. The nematic liquid crystal is a surface stabilized ferroelectric liquid crystal which has a chevron structure. A voltage with a rectangular waveform of 0.1 Hz is applied to this panel whereby the chevron structure is made into a pseudo-bookshelf structure, for example, striped structure. The layered structure of the liquid crystal is changed whereby a gray scale display is possible without any defect on the display because there is no disorder of the orientation of the liquid crystal molecules.

First Comparative Example

The above structure is the same as in the first embodiment, but the In contrast to the first embodiment, the; directions of the rubbing treatments to the first and second substrates are parallel to each other and are set so that a layered structure 1 of the liquid crystal of the smectic phase is vertical to the scanning electrode line 12. The first and second substrates are bonded to each other via spacers comprising spherical silica particles so as to form a gap of 1.5 micrometers between the first and second substrates whereby a display panel is formed.

A ferroelectric liquid crystal having a chiral smectic C phase is introduced into the gap between the first and second substrates. A gray scale display is possible but a certain defect on the display appears in the vicinity of the scanning electrode line 12 is altered due to a certain disorder of the orientation of the liquid crystal molecules.

Second Embodiment

A second embodiment according to the present invention will be described hereafter. The present invention is applied to the thin film transistor liquid crystal display with thin film transistor liquid crystal cell arrays. As an active element, a thin film transistor 11 including an amorphous silicon layer is used. Each pixel has a size of 300×100 micrometers. A scanning electrode line 12 and a signal electrode line 13 comprise chromium lines having a width of 10 micrometers which has been prepared by a sputtering method. The thin film transistor 11 has a gate oxide film which is made of silicon nitride. Each pixel electrode 10 is transparent and made of indium tin oxide. The each pixel electrode 10 is formed by a sputtering method. The thin film transistors 11 are formed in array on a first substrate made of a glass material. An opposite substrate is provided in parallel to the first substrate and spaced apart from the first substrate. On the second substrate, an optical shielding film made of chromium is formed and subsequently a common electrode is formed thereon, which is transparent and is made of indium tin oxide. Further, a color filter is formed in matrix by a dyeing method on the common electrode. A protection layer made of silica is further formed on the color filter.

After cleaning the first and second substrates, polyarnide films are applied on the first and second substrates by a spin coating method before the first and second substrates are baked to make the polyamide films into polyimide orientation films. The polyimide orientation films on the first and second substrates are subjected to ten rubbing treatments by use of a velvet film. The directions of the rubbing treatments to the first and second substrates are anti-parallel to each other and are set so that a layered structure 1 of the liquid crystal of the smectic phase is parallel to the scanning electrode line 12. The first and second substrates are bonded to each other via spacers comprising spherical silica particles so as to form a gap of 2.0 micrometers between the first and second substrates whereby a display panel is formed.

A ferroelectric liquid crystal having a chiral smectic C phase is introduced into the gap between the first and second substrates. The liquid crystal has a mono-stable bookshelf structure. The panel is heated so that the liquid crystal enters into a chiral nematic state and then applied with an electric field ranging from 20 to 50 V at a frequency of 700 Hz. During the voltage application to the liquid crystal, the liquid crystal is cooled down so that the liquid crystal enters into the smectic A-phase and then into the chiral smectic C phase whereby the mono-domain liquid crystal is formed without any disorder of orientation of the liquid crystal molecules. A gray scale display is possible without any defect on the display because there is no disorder of the orientation of the liquid crystal molecules.

Second Comparative Example

A second comparative example according to the present invention will be described hereafter.

In contrast to the second embodiment, the directions of the rubbing treatments to the first and second substrates are anti-parallel to each other and are set so that a layered structure 1 of the liquid crystal of the smectic phase is vertical to the scanning electrode line 12 The first and second substrates are bonded to each other via spacers comprising spherical silica particles so as to form a gap of 2.0 micrometers between the first and second substrates whereby a display panel is formed.

A ferroelectric liquid crystal having a chiral smectic C phase is introduced into the gap between the first and second substrates. The liquid crystal has a mono-stable bookshelf structure. The panel is heated so that the liquid crystal enters into a chiral nematic state and then applied with an electric field ranging from 20 to 50 V at a frequency of 700 Hz. During the voltage application to the liquid crystal, the liquid crystal is cooled down so that the liquid crystal enters into the smectic A-phase and then into the chiral smectic C phase whereby the mono-domain liquid crystal is not formed with a certain disorder of orientation of the liquid crystal molecules. A gray scale display is possible with, however, a certain defect on the display in the vicinity of the scanning electrode lines 12 due to disorder of the orientation of the liquid crystal molecules. If the display is operated for a long time, striped patterns appears in the vicinity of the scanning electrode lines 12. The contrast is largely reduced.

Third Embodiment

A third embodiment according to the present invention will be described hereafter. The present invention is applied to the thin film transistor liquid crystal display. FIG. 14 illustrates thin film transistor liquid crystal cell arrays used in this embodiment. As an active element, a thin film transistor 11 including an amorphous silicon layer is used. Each pixel has a size of 300×100 micrometers. A scanning electrode line 12 and a signal electrode line 13 comprise chromium lines having a width of 10 micrometers which has been prepared by a sputtering method. The thin film transistor 11 has a gate oxide film which is made of silicon nitride. Each pixel electrode 10 is transparent and made of indium tin oxide. The each pixel electrode 10 is formed by a sputtering method. The thin film transistors 11 are formed in array on a first substrate made of a glass material. An opposite substrate is provided in parallel to the first substrate and spaced apart from the first substrate. On the second substrate, an optical shielding film made of chromium is formed and subsequently a common electrode is formed thereon, which is transparent and is made of indium tin oxide. Further, a color filter is formed in matrix by a dyeing method on the common electrode. A protection layer made of silica is further formed on the color filter.

After cleaning the first and second substrates, polyamide films are applied on the first and second substrates before the first and second substrates are burned at a temperature of 180°C. to make the polyamide films into polyimide orientation films. The polyimide orientation films on the first and second substrates are subjected to a rubbing treatment by use of a buff cloth of rayon. The directions of the rubbing treatments to the first and second substrates are anti-parallel to each other and are set so that a layered structure 1 of the liquid crystal of the smectic phase is parallel to the scanning electrode line 12. The first and second substrates are bonded to each other via spacers comprising spherical silica particles so as to form a gap of 2.2 micrometers between the first and second substrates whereby a display panel is formed.

A deformed helix ferroelectric liquid crystal having a chiral smectic C phase with a short helix pitch is introduced into the gap between the first and second substrates. An apparent tilt angle of major axis of deformed helix ferroelectric liquid crystal molecules in the deformed helix ferroelectric liquid crystal is 30.0 degrees. An angle of the cone drawn by the major axis of ferroelectric liquid crystal molecules is approximately 60.0 degrees.

A test cell having the same structure as described above is prepared so that a nematic liquid crystal is introduced into the gap between the substrates of the test cell. A pre-tilt angle of nematic liquid crystal molecules in the nematic liquid crystal is 1.5 degrees. The deformed helix structure is such that the orientations of the liquid crystal display are changed within the layered structure 1. A gray scale display is possible without any defect on the display because no disorder of the orientation of the liquid crystal molecules.

Third Comparative Example

A third comparative example according to the present invention will be described hereafter.

In contrast to the third embodiment, the; directions of the rubbing treatments to the first and second substrates are anti-parallel to each other and are set so that a layered structure 1 of the liquid crystal of the smectic phase is vertical to the scanning electrode line 12. The first and second substrates are bonded to each other via spacers comprising spherical silica particles so as to form a gap of 2.2 micrometers between the first and second substrates whereby a display panel is formed.

A deformed helix ferroelectric liquid crystal having a chiral smectic C phase with a short helix pitch is introduced into the gap between the first and second substrates. A gray scale display is possible with a certain reduction in contrast when a polarizing plate is placed thereon. If the polarizing plates are placed and no voltage is applied to the liquid crystal to make a dark image, then a brightness in the vicinity of the scanning electrode line 12 is altered. This means that a certain disorder of the orientation of the liquid crystal molecules is caused.

Fourth Embodiment

A fourth embodiment according to the present invention will be described hereafter. The present invention is applied to the thin film transistor liquid crystal display. FIG. 15 illustrates thin film transistor liquid crystal cell arrays used in this embodiment. As an active element, a thin film transistor 11 including an amorphous silicon layer is used. Each pixel has a size of 300×100 micrometers. A scanning electrode line 12 and a signal electrode line 13 comprise chromium lines having a width of 10 micrometers which has been prepared by a sputtering method. The thin film transistor 11 has a gate oxide film which is made of silicon nitride. Each pixel electrode 10 is transparent and made of indium tin oxide. The each pixel electrode 10 is formed by a sputtering method. The thin film transistors 11 are formed in array on a first substrate made of a glass material. An opposite substrate is provided in parallel to the first substrate and spaced apart from the first substrate. On the second substrate, an optical shielding film made of chromium is formed and subsequently a common electrode is formed thereon, which is transparent and is made of indium tin oxide. Further, a color filter is formed in matrix by a dyeing method on the common electrode. A protection layer made of silica is further formed on the color filter.

After cleaning the first and second substrates, polyamide films are applied on the first and second substrates before the first and second substrates are burned at a temperature of 200° C. to make the polyamide films into polyimide orientation films. The polyimide orientation films on the first and second substrates are subjected to a rubbing treatment by use of a buff cloth of rayon. The directions of the rubbing treatments to the first and second substrates are different by 90 degrees from each other and are set so that a layered structure 1 of the liquid crystal of the smectic phase is parallel to the scanning electrode line 12. The first and second substrates are bonded to each other via spacers comprising spherical silica particles so as to form a gap of 3.4 micrometers between the first and second substrates whereby a display panel is formed.

A test cell having the same structure as described above is prepared so that a nematic liquid crystal is introduced into the gap between the substrates of the test cell. A pre-tilt angle of nematic liquid crystal molecules in the nematic liquid crystal is 4.5 degrees. The nematic liquid crystal has a ferroelectric twisted smectic structure such that the orientation of the liquid crystal molecules are varied by 90 degrees between the first and second substrates. A gray scale display is possible without any defect on the display because there is no disorder of the orientation of the liquid crystal molecules.

Fourth Comparative Example

A fourth comparative example according to the present invention will be described hereafter.

The above structure is the same as in the fourth embodiment but the

In contrast to the third embodiment, the; directions of the rubbing treatments to the first and second substrates are different by 90 degrees from each other and are set so that a layered structure 1 of the liquid crystal of the smectic phase is vertical to the scanning electrode line 12. The first and second substrates are bonded to each other via spacers comprising spherical silica particles so as to form a gap of 3.4 micrometers between the first and second substrates whereby a display panel is formed.

A gray scale display is possible with a certain reduction in contrast when a polarizing plate is placed thereon. If the polarizing plates are placed and no voltage is applied to the liquid crystal to make a dark image, then a brightness in the vicinity of the scanning electrode line 12 is altered. This means that a certain disorder of the orientation of the liquid crystal molecules is caused.

Fifth Embodiment

A fifth embodiment according to the present invention will be described hereafter. The present invention is applied to the thin film transistor liquid crystal display with thin film transistor liquid crystal cell arrays used in this embodiment.

As an active element, a thin film transistor 11 including an amorphous silicon layer is used. Each pixel has a size of 300 ×100 micrometers. A scanning electrode line 12 and a signal electrode line 13 comprise chromium lines having a width of 10 micrometers which has been prepared by a sputtering method. The thin film transistor 11 has a gate oxide film which is made of silicon nitride. Each pixel electrode 10 is transparent and made of indium tin oxide. The each pixel electrode 10 is formed by a sputtering method. The thin film transistors 11 are formed in array on a first substrate made of a glass material. An opposite substrate is provided in parallel to the first substrate and spaced apart from the first substrate. On the second substrate, an optical shielding film made of chromium is formed and subsequently a common electrode is formed thereon, which is transparent and is made of indium tin oxide. Further, a color filter is formed in matrix by a dyeing method on the common electrode. A protection layer made of silica is further formed on the color filter.

After cleaning the first and second substrates, polyamide films made of polyimide classified into aromatic ring system are applied on the first and second substrates by a spin coating method before the first and second substrates are baked to make the polyamide films into polyimide orientation films. The polyimide orientation films on the first and second substrates are subjected to a rubbing treatment by use of a buff cloth of rayon. The directions of the rubbing treatments to the first and second substrates are different by 90 degrees from each other and are set so that a layered structure 1 of the liquid crystal of the smectic phase is parallel to the scanning electrode line 12. The first and second substrates are bonded to each other via spacers comprising spherical silica particles so as to form a gap of 1.6 micrometers between the first and second substrates whereby a display panel is formed.

An anti-ferroelectric liquid crystal having a chiral smectic C phase is introduced into the gap between the first and second substrates.

A test cell having the same structure as described above is prepared so that a nematic liquid crystal is introduced into the gap between the substrates of the test cell. A pre-tilt angle of nematic liquid crystal molecules in the nematic liquid crystal is 1.0 degree. The nematic liquid crystal has a tristable anti-ferroelectric liquid crystal structure. A gray scale display is possible without any defect on the display because there is no disorder of the orientation of the liquid crystal molecules.

Fifth Comparative Example

A fifth comparative example according to the present invention will be described hereafter. are The above structure is the same as in the fifth embodiment but the In contrast to the fifth embodiment, the; directions of the rubbing treatments to the first and second substrates are different by 90 degrees from each other and are set so that a layered structure 1 of the liquid crystal of the smectic phase is vertical to the scanning electrode line 12. The first and second substrates are bonded to each other via spacers comprising spherical silica particles so as to form a gap of 1.6 micrometers between the first and second substrates whereby a display panel is formed.

An anti-ferroelectric liquid crystal having a chiral smectic C phase is introduced into the gap between the first and second substrates.

A gray scale display is possible with a certain defect on the display due to a certain disorder of the orientation of the liquid crystal molecules is caused. This may result from the fact that a lateral electric field is generated which have the ferroelectric of the liquid crystal remain without returning to anti-ferroelectric liquid crystal. Since the ferroelectric liquid crystal applied with the lateral electric field differs in orientation of the liquid crystal molecules from the liquid crystal in the brightness state, any remarkable reduction in contrast of the display is not observed. Notwithstanding, a gray scale property relative to the voltage applied is partially changed. This makes it difficult to do an accurate control of the gray scale.

As modifications of the foregoing preferred embodiments, the present invention may be applicable to any other substrate structure for generating the lateral electric field.

If the relative angles among the normal of the layered structure and the center axis of the cone drawn by the major axis of the liquid crystal molecule is fixed, then it is possible that the center axis of the cone is set to be almost parallel to the direction of the lateral electric field so that planes of the layered structure of the liquid crystal is parallel to the scanning lines.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to over by claims all modifications which fall within the spirit and scope of the present invention.

What is claimed is:

1. A liquid crystal in a liquid crystal display, said liquid crystal being in the form of a layered structure between first and second substrates being spaced apart from and parallel to each other, opposing pairs of electrodes being disposed upon respective said first and second substrates, a plurality of overlapping control electrodes also being disposed upon said first and second substrates, an intrinsic electric field being applied between said pairs of opposing electrodes for controlling orientation of liquid crystal molecules, at least one of said opposing pairs of electrodes and at least one of said selection electrodes being disposed on one of said first and second substrates adjacent each other and applied with different voltages so that at least a lateral electric field is generated in parallel to surfaces of said first and second substrates, wherein planes of said layered structure of said liquid crystal are just or almost perpendicular to a direction of said lateral electric field.

2. The liquid crystal as claimed in claim 1, wherein if plural lateral electric fields are generated which have different intensities, then said planes of said layered structure of said liquid crystal are just or almost perpendicular to a direction of a strongest lateral electric field among said plural lateral electric fields.

3. The liquid crystal as claimed in claim 1, wherein said electrodes generating said lateral electric field are a scanning electrode and a pixel electrode.

4. The liquid crystal as claimed in claim 1, wherein said liquid crystal comprises a ferroelectric liquid crystal having a smectic phase.

5. The liquid crystal as claimed in claim 4, wherein said smectic phase is a chiral smectic phase.

6. The liquid crystal as claimed in claim 5, wherein said ferroelectric liquid crystal having said chiral smectic phase is a surface stabilized ferroelectric liquid crystal.

7. The liquid crystal as claimed in claim 5, wherein said ferroelectric liquid crystal having said chiral smectic phase has a pseudo-bookshelf structure prepared by applying a low frequency electric field to said liquid crystal.

8. The liquid crystal as claimed in claim 5, wherein said ferroelectric liquid crystal having said chiral smectic phase takes a single stable state in which a direction of spontaneous polarization of liquid crystal molecules is perpendicular to said surfaces of said first and second substrates and perpendicular to a direction of rubbing treatment performed on said first and second substrates.

9. The liquid crystal as claimed in claim 5, wherein said ferroelectric liquid crystal having said chiral smectic phase has a deformed helical structure.

10. The liquid crystal as claimed in claim 5, wherein said ferroelectric liquid crystal having said chiral smectic phase has a twisted nematic structure.

11. The liquid crystal as claimed in claim 1, wherein said liquid crystal comprises an anti-ferroelectric liquid crystal having a smectic phase.

12. The liquid crystal as claimed in claim 11, wherein said smectic phase is a chiral smectic phase.

13. The liquid crystal of claim 1, wherein each said pair of opposing electrodes comprises a pixel electrode and an opposite electrode, the plurality of overlapping electrodes comprises parallel scanning electrodes and parallel signal electrodes, the scanning electrodes being disposed generally perpendicular to the signal electrodes, the lateral electric field being generated between respective said scanning electrodes and said pixel electrodes.

14. A liquid crystal in a liquid crystal display, said liquid crystal being in the form of a layered structure between first and second substrates being spaced apart from and parallel to each other, opposing pairs of electrodes being disposed upon respective said first and second substrates, a plurality of overlapping selection electrodes also being disposed upon said first and second substrates, an intrinsic electric field being applied between said pairs of opposing electrodes for controlling orientation of liquid crystal molecules, at least one of said opposing pairs of electrodes and at least one of said selection electrodes being disposed on one of said first and second substrates adjacent each other and applied with different voltages so that at least a lateral electric field is generated in parallel to surfaces of said first and second substrates, and further that each of said liquid crystal molecules shows a tilting motion under control by application of said intrinsic electric field so as to have a major axis of said each liquid crystal molecule draw a cone, wherein a center axis of said cone has a projected component on said first and second substrates and said projected component is just or almost parallel to a direction of said lateral electric field.

15. The liquid crystal as claimed in claim 14, wherein if plural lateral electric fields are generated which have different intensities, then said projected component is just or almost parallel to a direction of a strongest lateral electric field among said plural lateral electric fields.

16. The liquid crystal as claimed in claim 14, wherein said electrodes generating said lateral electric field are a scanning electrode and a pixel electrode.

17. The liquid crystal as claimed in claim 14, wherein said liquid crystal comprises a ferroelectric liquid crystal having a smectic phase.

18. The liquid crystal as claimed in claim 17, wherein said smectic phase is a chiral smectic phase.

19. The liquid crystal as claimed in claim 18, wherein said ferroelectric liquid crystal having said chiral smectic phase is a surface stabilized ferroelectric liquid crystal.

20. The liquid crystal as claimed in claim 18, wherein said ferroelectric liquid crystal having chiral smectic phase has a pseudo-bookshelf structure prepared by applying a low frequency electric field to said liquid crystal.

21. The liquid crystal as claimed in claim 18, wherein said ferroelectric liquid crystal having said chiral smectic phase takes a single stable state in which a direction of spontaneous polarization of liquid crystal molecules is perpendicular to said surfaces of said first and second substrates and perpendicular to a direction of rubbing treatment performed on said first and second substrates.

22. The liquid crystal as claimed in claim 18, wherein said ferroelectric liquid crystal having said chiral smectic phase has a deformed helical structure.

23. The liquid crystal as claimed in claim 18, wherein said ferroelectric liquid crystal having said chiral smectic phase has a twisted nematic structure.

24. The liquid crystal as claimed in claim 14, wherein said liquid crystal comprises an anti-ferroelectric liquid crystal having a smectic phase.

25. The liquid crystal as claimed in claim 24, wherein said smectic phase is a chiral smectic phase.

26. The liquid crystal of claim 14, wherein each said pair of opposing electrodes comprises a pixel electrode and an opposite electrode, the plurality of overlapping electrodes comprises parallel scanning electrodes and parallel signal electrodes, the scanning electrodes being disposed generally perpendicular to the signal electrodes, the lateral electric field being generated between respective said scanning electrodes and said pixel electrodes.

27. A liquid crystal display comprising:

first and second substrates being spaced apart from and parallel to each other, opposing pairs of electrodes being disposed upon respective said first and second substrates, a plurality of overlapping selection electrodes also being disposed upon said first and second substrates;

a liquid crystal being in the form of a layered structure between said first and second substrates, orientation of said liquid crystal being controlled by an intrinsic electric field applied between said pairs of opposing electrodes; and at least one of said opposing pairs of electrodes and at least one of said first and second selection electrodes being disposed on one of said first and second substrates adjacent each other and applied with different voltages so that at least a lateral electric field is generated in parallel to surfaces of said first and second substrates, wherein planes of said layered structure of said liquid crystal are just or almost perpendicular to a direction of said lateral electric field.

28. The liquid crystal display as claimed in claim 27, wherein if plural lateral electric fields are generated which have different intensities, then said planes of said layered structure of said liquid crystal are just or almost perpendicular to a direction of a strongest lateral electric field among said plural lateral electric fields.

29. The liquid crystal as claimed in claim 27, wherein said electrodes generating said lateral electric field are a scanning electrode and a pixel electrode.

30. The liquid crystal display as claimed in claim 27, wherein said liquid crystal comprises a ferroelectric liquid crystal having a smectic phase.

31. The liquid crystal display as claimed in claim 30, wherein said smectic phase is a chiral smectic phase.

32. The liquid crystal display as claimed in claim 31, wherein said ferroelectric liquid crystal having said chiral smectic phase is a surface stabilized ferroelectric liquid crystal.

33. The liquid crystal display as claimed in claim 31, wherein said ferroelectric liquid crystal having said chiral smectic phase has a pseudo-bookshelf structure prepared by applying a low frequency electric field to said liquid crystal.

34. The liquid crystal as claimed in claim 31, wherein said ferroelectric liquid crystal having said chiral smectic phase takes a single stable state in which a direction of spontaneous polarization of liquid crystal molecules is perpendicular to said surfaces of said first and second substrates and perpendicular to a direction of rubbing treatment performed on said first and second substrates.

35. The liquid crystal display as claimed in claim 31, wherein said ferroelectric liquid crystal having said chiral smectic phase has a deformed helical structure.

36. The liquid crystal display as claimed in claim 31, wherein said ferroelectric liquid crystal having said chiral smectic phase has a twisted nematic structure.

37. The liquid crystal display as claimed in claim 27, wherein said liquid crystal comprises an anti-ferroeletric liquid crystal having a smectic phase.

38. The liquid crystal display as claimed in claim 37, wherein said smectic phase is a chiral smectic phase.

39. The liquid crystal of claim 27, wherein each said pair of opposing electrodes comprises a pixel electrode and an opposite electrode, the plurality of overlapping electrodes comprises parallel scanning electrodes and parallel signal electrodes, the scanning electrodes being disposed generally perpendicular to the signal electrodes, the lateral electric field being generated between respective said scanning electrodes and said pixel electrodes.

40. A liquid crystal display comprising:

first and second substrates being spaced apart from and parallel to each other, opposing pairs of electrodes being disposed upon respective said first and second substrates, a plurality of overlapping selection electrodes also being disposed upon said first and second substrates;

a liquid crystal being in the form of a layered structure between said first and second substrates, orientation of said liquid crystal being controlled by an intrinsic electric field applied between said pairs of opposing electrodes so that each of said liquid crystal molecules shows a tilting motion to have a major axis of said each liquid crystal molecule draw a cone; and at least one of said opposing pairs of electrodes and at least one of said selection electrodes being disposed on one of said first and second substrates adjacent each other and applied with different voltages so that at least a lateral electric field is generated in parallel to surfaces of said first and second substrates, wherein a center axis of said cone has a projected component on said first and second substrates and said projected component is just or almost parallel to a direction of said lateral electric field.

41. The liquid crystal as claimed in claim 40, wherein if plural lateral electric fields are generated which have different intensities, then said projected component is just or almost parallel to a direction of a strongest lateral electric field among said plural lateral electric fields.

42. The liquid crystal as claimed in claim 40, wherein said electrodes generating said lateral electric field are a scanning electrode and a pixel electrode.

43. The liquid crystal display as claimed in claim 40, wherein said liquid crystal comprises a ferroelectric liquid crystal having a smectic phase.

44. The liquid crystal display as claimed in claim 43, wherein said smectic phase is a chiral smectic phase.

45. The liquid crystal display as claimed in claim 44, wherein said ferroelectric liquid crystal having said chiral smectic phase is a surface stabilized ferroelectric liquid crystal.

46. The liquid crystal display as claimed in claim 44, wherein said ferroelectric liquid crystal having said chiral smectic phase has a pseudo-bookshelf structure prepared by applying a low frequency electric field to said liquid crystal.

47. The liquid crystal as claimed in claim 44, wherein said ferroelectric liquid crystal having said chiral smectic phase takes a single stable state in which a direction of spontaneous polarization of liquid crystal molecules is perpendicular to said surfaces of said first and second substrates and perpendicular to a direction of rubbing treatment performed on said first and second substrates.

48. The liquid crystal display as claimed in claim 44, wherein said ferroelectric liquid crystal having said chiral smectic phase has a deformed helical structure.

49. The liquid crystal display as claimed in claim 44 wherein said ferroelectric liquid crystal having said chiral smectic phase has a twisted nematic structure.

50. The liquid crystal display as claimed in claim 40, wherein said liquid crystal comprises an anti-ferroelectric liquid crystal having a smectic phase.

51. The liquid crystal display as claimed in claim 50, wherein said smectic phase is a chiral smectic phase.

52. The liquid crystal of claim 40, wherein each said pair of opposing electrodes comprises a pixel electrode and an opposite electrode, the plurality of overlapping electrodes comprises parallel scanning electrodes and parallel signal electrodes, the scanning electrodes being disposed generally perpendicular to the signal electrodes, the lateral electric field being generated between respective said scanning electrodes and said pixel electrodes.

* * * * *